US008605112B2

(12) United States Patent
Yamauchi

(10) Patent No.: US 8,605,112 B2
(45) Date of Patent: Dec. 10, 2013

(54) GRAPHICS DRAWING APPARATUS, METHOD, AND PROGRAM AND RECORDING MEDIUM ON WHICH THE PROGRAM IS RECORDED

(75) Inventor: Hideaki Yamauchi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 597 days.

(21) Appl. No.: 12/209,635

(22) Filed: Sep. 12, 2008

(65) Prior Publication Data

US 2009/0073180 A1 Mar. 19, 2009

(30) Foreign Application Priority Data

Sep. 13, 2007 (JP) ................................. 2007-238479

(51) Int. Cl.
*G09G 5/00* (2006.01)
*G06T 11/20* (2006.01)

(52) U.S. Cl.
USPC ........................... 345/619; 345/620; 345/440

(58) Field of Classification Search
USPC ................. 345/620, 619, 635, 654, 440, 569; 382/284
See application file for complete search history.

(56) References Cited

U.S. PATENT DOCUMENTS

| | | | |
|---|---|---|---|
| 6,320,580 B1* | 11/2001 | Yasui et al. ..................... | 345/421 |
| 6,774,897 B2* | 8/2004 | Moriwaki ...................... | 345/427 |
| 6,952,204 B2* | 10/2005 | Baumberg et al. ............ | 345/420 |
| 7,142,213 B2* | 11/2006 | Nakatsuka et al. ............ | 345/501 |
| 7,742,061 B2* | 6/2010 | Chen .............................. | 345/620 |
| 2002/0047841 A1* | 4/2002 | Moriwaki ...................... | 345/419 |
| 2005/0093882 A1* | 5/2005 | Cosman ......................... | 345/611 |

FOREIGN PATENT DOCUMENTS

| | | |
|---|---|---|
| JP | 03-050686 A | 3/1991 |
| JP | 10-188010 A | 7/1998 |
| JP | 2001-209812 A | 8/2001 |
| JP | 2002-245468 A | 8/2002 |

OTHER PUBLICATIONS

Japanese Office Action for Patent Application 2007-238479 dated Dec. 6, 2011.

* cited by examiner

*Primary Examiner* — Kee M Tung
*Assistant Examiner* — Leon T Cain, II
(74) *Attorney, Agent, or Firm* — Arent Fox LLP

(57) ABSTRACT

A graphics drawing apparatus drawing a graphic, including: a generation unit, where a sequence of two-dimensional coordinates of vertices is input, generating the coordinates of each of the vertices and virtual vertex coordinates for the coordinates of each of the vertices on a memory, the virtual vertex coordinates being generated by converting the X-coordinate value of the coordinates of each of the vertices to the X-coordinate value of the coordinates of the leading vertex of the sequence; and a setting unit that sets the coordinates of two vertices of a partial graphic that is to be created as the coordinates of two adjacent vertices, in sequence starting from the leading vertex, and, after setting the coordinates of the trailing vertex of the sequence, setting the coordinates of two vertices of the partial graphic that is to be created as the coordinates of the leading and trailing vertices.

8 Claims, 28 Drawing Sheets

GRAPHICS DRAWING APPARATUS, METHOD, AND PROGRAM AND RECORDING MEDIUM ON WHICH THE PROGRAM IS RECORDED

CROSS-REFERENCE TO RELATED APPLICATION

This application is based upon and claims the benefit of priority of the prior Japanese Patent Application No. 2007-238479, filed on Sep. 13, 2007, the entire contents of which are incorporated herein by reference.

BACKGROUND

1. Field

The embodiments discussed herein are directed to a graphics drawing apparatus, a graphics drawing method, and a graphics drawing program which draw graphics by using a memory corresponding to a two-dimensional coordinate system consisting of an X-axis representing a direction in which consecutive memory addresses are arranged and a Y-axis representing the direction intersecting the X-axis in applications such as computer graphics, and to a recording medium on which the program is recorded.

2. Description of the Related Art

Stencil buffers, which store the shapes of graphics to be drawn, are used in applications such as computer graphics. There are the following techniques for drawing a desired graphic in a stencil buffer area. For example, there is a technique in which, for a sequence of vertex coordinates input from a vertex coordinate stream, triangles that share vertex coordinates input as the coordinates of the leading vertex are drawn by using exclusive-OR operation one by one each time vertex coordinates are input, thereby forming a final graphic to be drawn (hereinafter referred to as a "subject graphic").

In another technique, each time vertex coordinates are input from a vertex coordinate stream, sides of the contour of a subject graphic, each being formed by the coordinates of two adjacent vertices, are drawn one by one and a rectangle is drawn from each of the sides drawn to one! end of a stencil buffer area by using exclusive-OR operation, thereby constructing a subject graphic (for example, see Japanese Patent Laid-Open No. 2001-209812 and No. 10-188010).

However, the existing technique described earlier has a problem that, because all the triangles that make up subject graphic share the coordinates of the leading vertex as described above, the coordinates of the other vertices of some triangles are positioned far away from the leading vertex coordinates and therefore many scan lines are involved in the drawing.

When many scan lines are involved, the difference between memory addresses associated with the pixels on the scan lines is large and therefore data cannot efficiently be transferred from a VRAM (Video RAM) to a stencil buffer with burst access and the rendering speed decreases. Furthermore, when many triangles in which many scan lines are involved are drawn, the scan lines are swept back and forth many times to draw the triangles. Random access to the VRAM takes place at each sweep, which reduces the rendering speed.

The technique disclosed in Japanese Patent Laid-Open No. 2001-209812 or No. 10-188010 draws pixels in the direction in which consecutive memory addresses are arranged and therefore can alleviate the problem described above. However, scan lines involved in drawing are processed to their ends. Thus, the technique suffers from low rendering speeds because rendering is applied to a wider range than necessary.

Additionally, the technique requires implementation of an extra dedicated mechanism called a scan line algorithm, adding to the cost of the products (a detailed description of which is omitted here since it is well known in the art).

SUMMARY

It is an aspect of the embodiments discussed herein to provide a graphics drawing apparatus drawing a graphic, including: a memory corresponding to a two-dimensional coordinate system including an X-axis representing a direction in which consecutive memory addresses are arranged and a Y-axis intersecting the X-axis; a generation unit, where a sequence of two-dimensional coordinates of vertices is input, generating the coordinates of each of the vertices and virtual vertex coordinates for the coordinates of each of the vertices on the memory, the virtual vertex coordinates being generated by converting the X-coordinate value of the coordinates of each of the vertices to the X-coordinate value of the coordinates of the leading vertex of the sequence; a setting unit that sets the coordinates of two vertices of a partial graphic that are to be created as the coordinates of two adjacent vertices, in sequence starting from the leading vertex, and, after setting the coordinates of the trailing vertex of the sequence, sets the coordinates of two vertices of the partial graphic that is to be created as the coordinates of the leading and trailing vertices; and a drawing unit performing a drawing process for drawing in the memory a partial graphic defined by the coordinates of two vertices and their virtual vertex coordinates set by the setting unit.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

Preferred embodiments of a graphics drawing apparatus according to the present invention will be described in detail with reference to the accompanying drawings. In first to third embodiments described below, a graphics drawing apparatus generates virtual vertex coordinates that are not in a vertex coordinate stream for input vertex coordinates for the sake of convenience and forms a partial graphic including the virtual vertex coordinates as its vertices. Such partial graphics are drawn one after another each time vertex coordinates are input, thereby constructing a subject graphic. Because each partial graphic contains many pixels that have consecutive memory addresses, the subject graphic can be efficiently drawn.

In the first to third embodiments described below, the coordinates of a vertex Vn will be denoted by "($V_nx$, $V_ny$)." Similarly, the coordinates of an intersection point Cn will be denoted by "($C_nx$, $C_ny$)."

A process for drawing a subject graphic according to the first embodiment will be described. FIGS. 1 to 8 are illustrations (1 of 8) to (8 of 8) showing a process for drawing a subject graphic by a graphics drawing apparatus according to the first embodiment. Shown in FIGS. 1 to 8 is a process for drawing a graphic while the coordinates of vertices V0 to V6 are input in sequence from a vertex coordinate stream.

Figure 1:
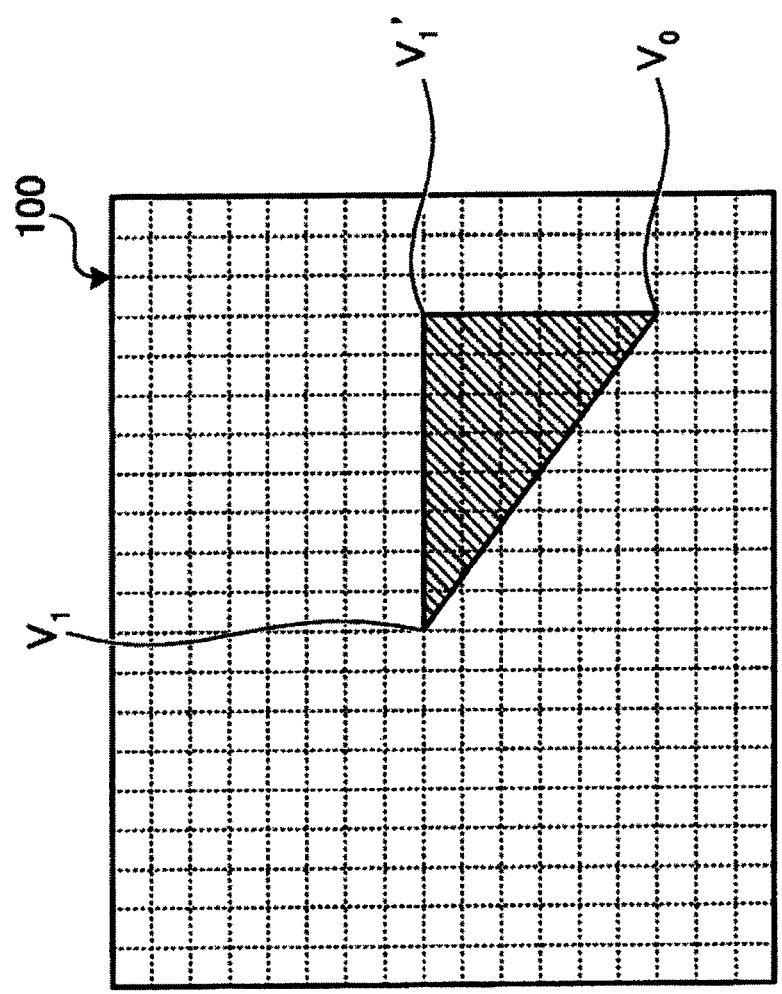
FIG. 1 is an illustration (1 of 8) showing a process for drawing a subject graphic by a graphics drawing apparatus according to a first embodiment.

In FIG. 1, in order to draw a subject graphic in a stencil buffer area 100 corresponding to a two-dimensional coordinate system consisting of the X-axis representing the direction in which consecutive memory addresses are arranged and the Y-axis representing the direction intersecting the X-axis (for example at right angles), first the coordinates of a leading vertex (V0x, V0y) are input in the graphics drawing apparatus through a vertex coordinate input interface and then the coordinates of an intermediate vertex (V1x, V1y) are input.

The graphics drawing apparatus sets the coordinates of the leading vertex (V0x, V0y) as the start-point coordinates (V0x, V0y) and sets the coordinates of the intermediate vertex (V1x, V1y) as intermediate vertex coordinates (V1x, V1y). The graphics drawing apparatus then generates the virtual vertex coordinates (V0x, V1y) of a virtual vertex V1' based on the start-point coordinates (V0x, V0y) and the intermediate vertex coordinates (V1x, V1y). That is, the virtual vertex V1' is generated at the coordinates with the same X-coordinate as the start-point coordinates (V0x, V0y) and the same Y-coordinate as the intermediate vertex coordinates (V1x, V1y). After generating the virtual vertex V1', the graphics drawing apparatus draws a partial graphic having vertices V0, V1, and V1' in the stencil buffer area 100 (FIG. 1).

Figure 2:
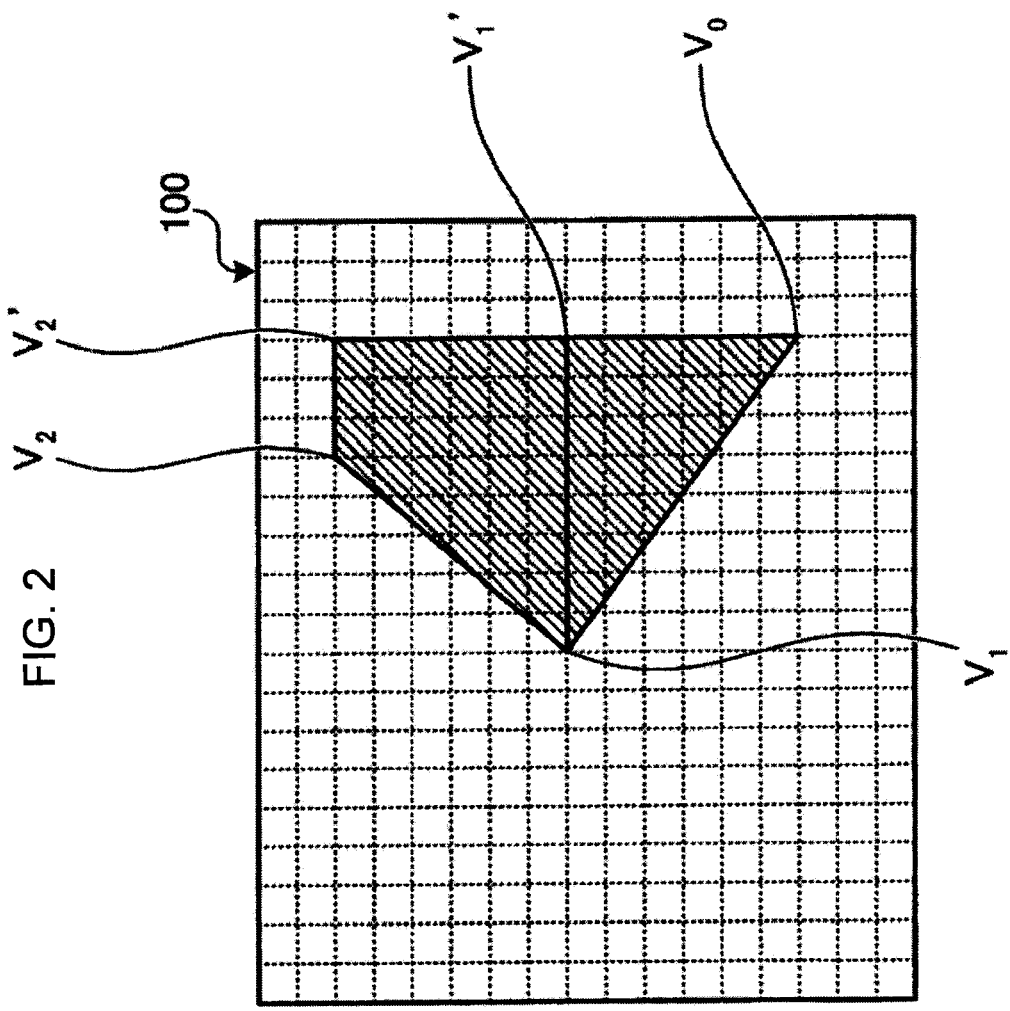
FIG. 2 is an illustration (2 of 8) showing the process for drawing the subject graphic by the graphics drawing apparatus according to the first embodiment.

Similarly, when the coordinates of another intermediate vertex (V2x, V2y) are input in the graphics drawing apparatus, the graphics drawing apparatus generates the virtual vertex coordinates (V0x, V2y) of a virtual vertex V2' based on the start-point coordinates (V0x, V0y) and the intermediate vertex coordinates (V2x, V2y). That is, the virtual vertex V2' is generated at the coordinates with the same X-coordinate as the start-point coordinates (V0x, V0y) and the same Y-coordinate as the intermediate vertex coordinates (V2x, V2y). After generating the virtual vertex V2', the graphics drawing apparatus draws a partial graphic having vertices V1, V1', V2', and V2 in the stencil buffer area 100 (FIG. 2).

Figure 3:
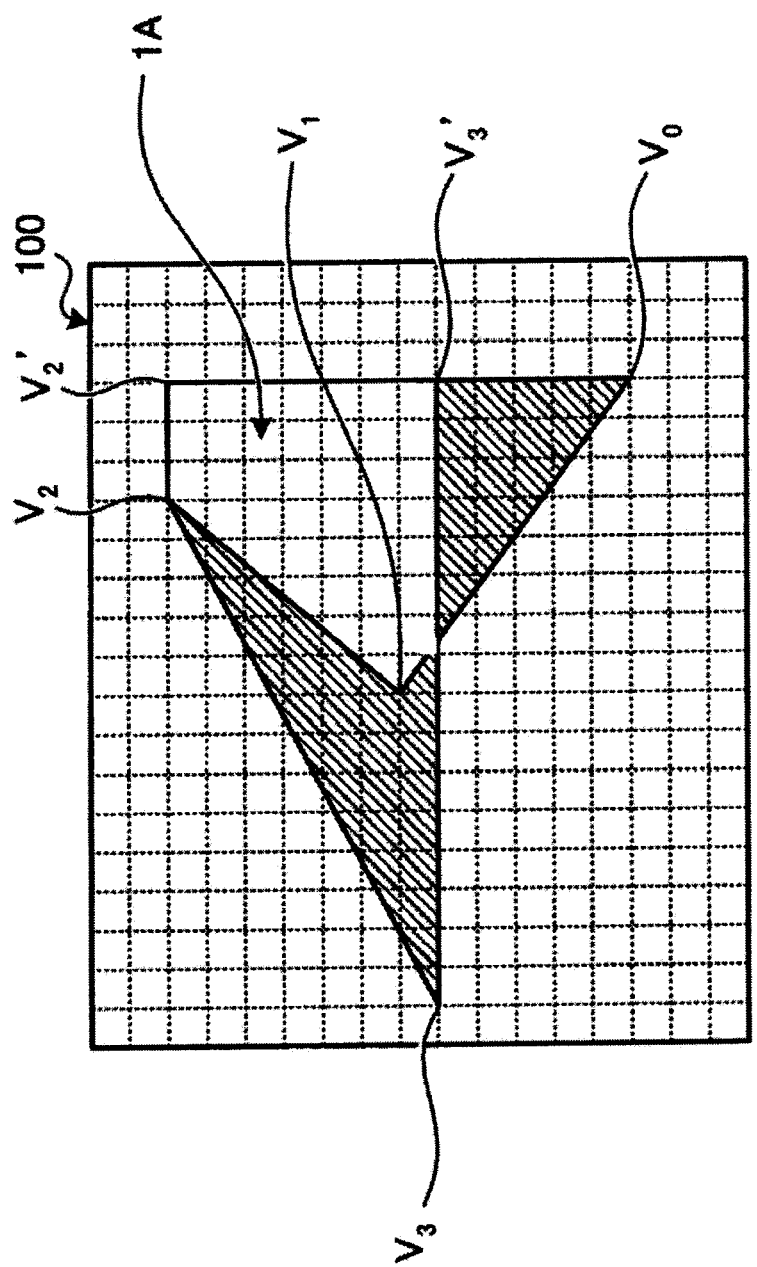
FIG. 3 is an illustration (3 of 8) showing the process for drawing the subject graphic by the graphics drawing apparatus according to the first embodiment.

Similarly, when the coordinates of another intermediate vertex (V3x, V3y) are input in the graphics drawing apparatus, the graphics drawing apparatus generates the virtual vertex coordinates (V0x, V3y) of a virtual vertex V3' based on the start-point coordinates (V0x, V0y) and the intermediate vertex coordinates (V3x, V3y). That is, the virtual vertex V3' is generated at the coordinates with the same X-coordinate as the start-point coordinates (V0x, V0y) and the same Y-coordinate as the intermediate vertex coordinates (V3x, V3y). After generating the virtual vertex V3', the graphics drawing apparatus draws a partial graphic having vertices V2, V2', V3', and V3 in the stencil buffer area 100 by using exclusive-OR operation. Because an even number of graphics overlaps one another in region 1A, the graphic within region 1A is deleted (FIG. 3).

Figure 4:
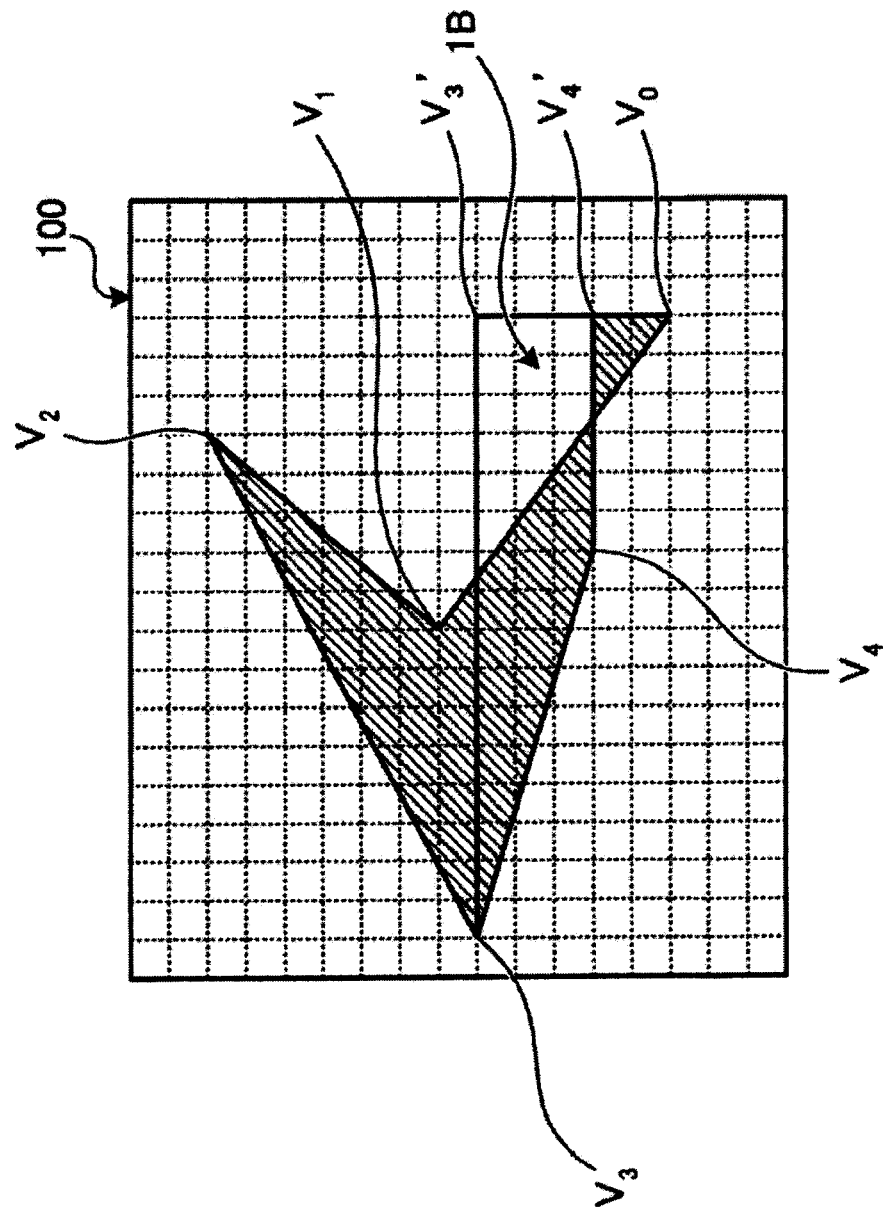
FIG. 4 is an illustration (4 of 8) showing the process for drawing the subject graphic by the graphics drawing apparatus according to the first embodiment.

When the coordinates of another intermediate vertex (V4$x$, V4$y$) are input in the graphics drawing apparatus, the graphics drawing apparatus generates the virtual vertex coordinates (V0$x$, V4$y$) of a virtual vertex V4' based on the start-point coordinates (V0$x$, V0$y$) and the intermediate vertex coordinates (V4$x$, V4$y$). That is, the virtual vertex V4' is generated at the coordinates with the same X-coordinate as the start-point coordinates (V0$x$, V0$y$) and the same Y-coordinate as the intermediate vertex coordinates (V4$x$, V4$y$). After generating the virtual vertex V4', the graphics drawing apparatus draws a partial graphics having vertices V3, V3', V4', and V4 in the stencil buffer area 100 by using exclusive-OR operation. Because an even number of graphics overlaps one another in region 1B, the graphic within region 1B is deleted (FIG. 4).

Figure 5:
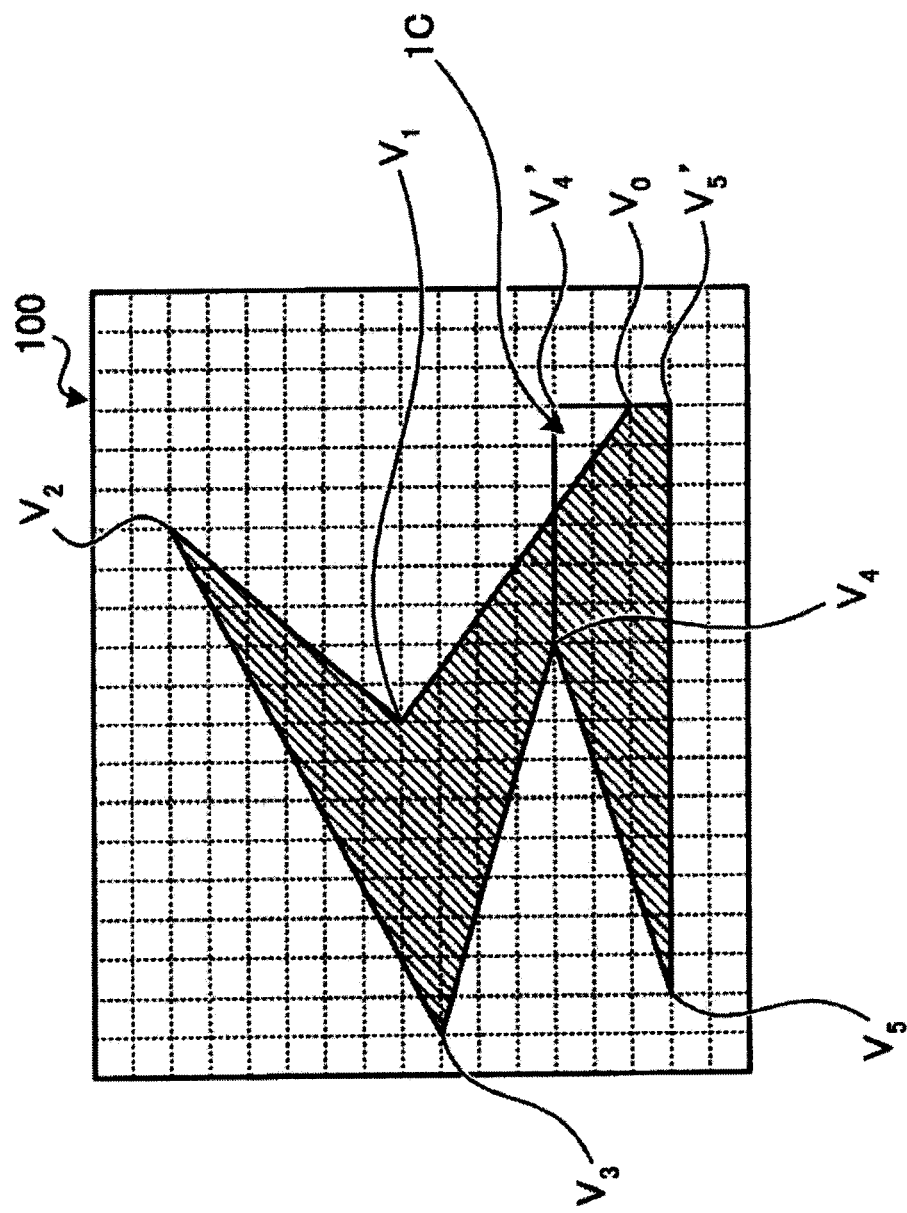
FIG. 5 is an illustration (5 of 8) showing the process for drawing the subject graphic by the graphics drawing apparatus according to the first embodiment.

When the coordinates of another intermediate vertex (V5$x$, V5$y$) are input in the graphics drawing apparatus, the graphics drawing apparatus generates the virtual vertex coordinates (V0$x$, V5$y$) of a virtual vertex V5' based on the start-point coordinates (V0$x$, V0$y$) and the intermediate vertex coordinates (V5$x$, V5$y$). That is, the virtual vertex V5' is generated at the coordinates with the same X-coordinate as the start-point coordinates (V0$x$, V0$y$) and the same Y-coordinate as the intermediate vertex coordinates (V5$x$, V5$y$). After generating the virtual vertex V5', the graphics drawing apparatus draws a partial graphic having vertices V4, V4', V5', and V5 in the stencil buffer area 100 by using exclusive-OR operation. Because an even number of graphics overlaps one another in region 1C, the graphic within region 1C is deleted (FIG. 5).

Figure 6:
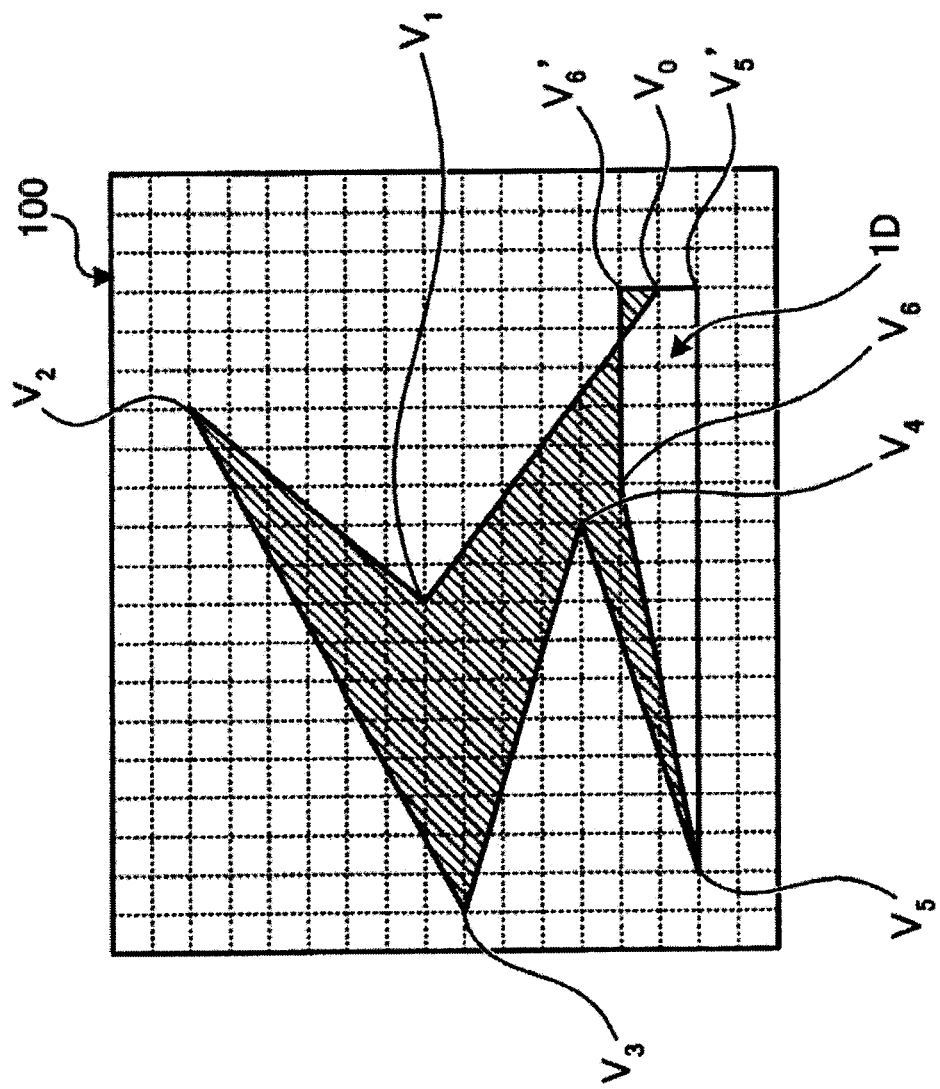
FIG. 6 is an illustration (6 of 8) showing the process for drawing the subject graphic by the graphics drawing apparatus according to the first embodiment.

When the coordinates of the trailing vertex (V6$x$, V6$y$) of the sequence of vertex coordinates are input in the graphics drawing apparatus, the graphics drawing apparatus determines that the coordinates (V6$x$, V6$y$) are the coordinates of the trailing vertex, and then generates the virtual vertex coordinates (V0$x$, V6$y$) of a virtual vertex V6' based on the start-point coordinates (V0$x$, V0$y$) and the intermediate vertex coordinates (V6$x$, V6$y$). That is, the virtual vertex V6' is generated at the coordinates with the same X-coordinate as the start-point coordinates (V0$x$, V0$y$) and the same Y-coordinate as the intermediate vertex coordinates (V6$x$, V6$y$). After generating the virtual vertex V6', the graphics drawing apparatus draws a partial graphic having vertices V5, V5', V6', and V6 in the stencil buffer area 100 by using exclusive-OR operation. Because an even number of graphics overlaps one another in region 1D, the graphic within region 1D is deleted (FIG. 6).

Figure 7:
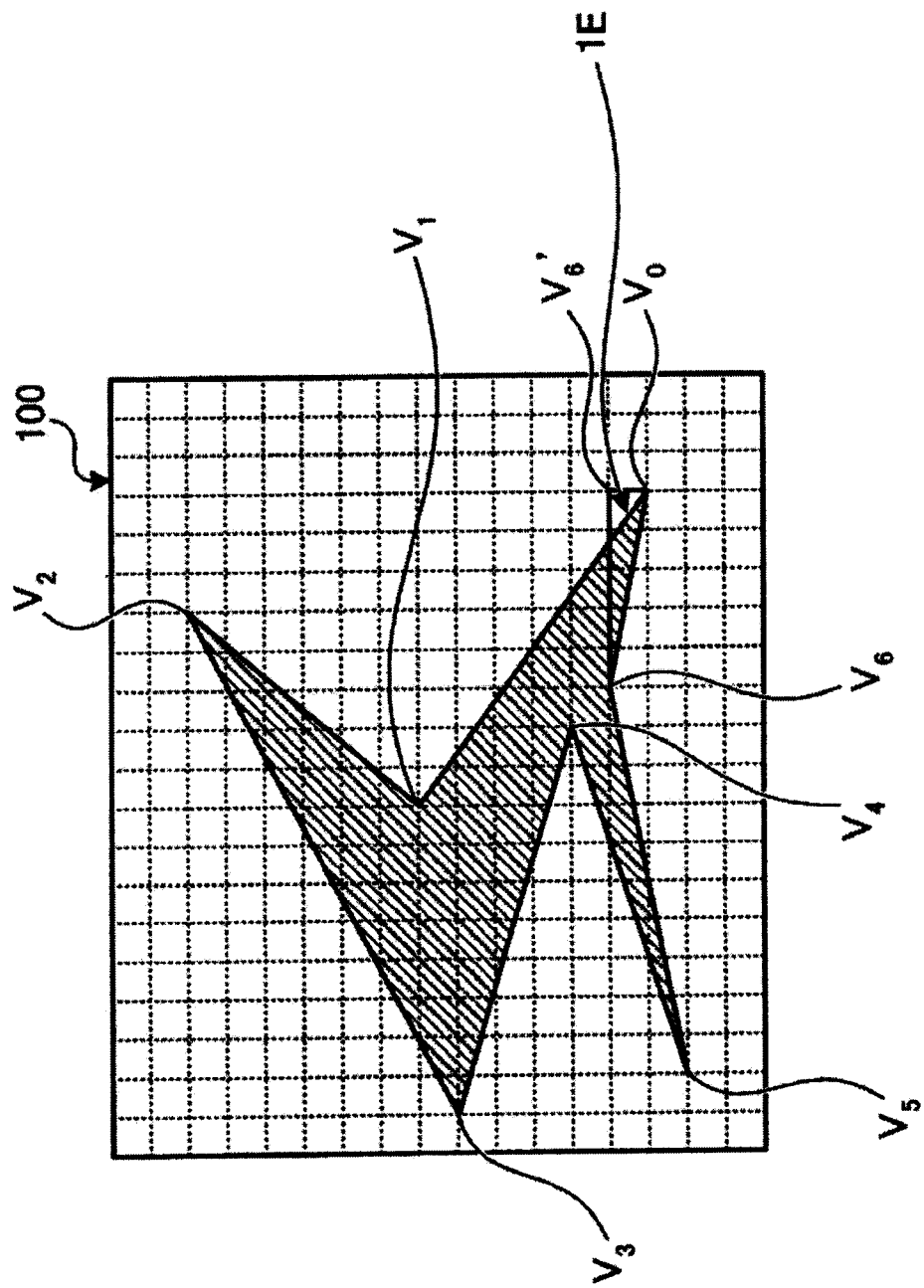
FIG. 7 is an illustration (7 of 8) showing the process for drawing the subject graphic by the graphics drawing apparatus according to the first embodiment.

After the coordinates determined as the coordinates of the trailing vertex (V6$x$, V6$y$) are input in the graphics drawing apparatus, the coordinates (V0$x$, V0$y$) established as the coordinates of the endpoint are re-input in the graphics drawing apparatus. After the coordinates of the endpoint (V0$x$, V0$y$) are input, the graphics drawing apparatus draws the last partial graphic (which will be detailed later) having vertices V6, V6', and V0 in the stencil buffer area 100 on the basis of the coordinates of the endpoint (V0$x$, V0$y$), the coordinates of the trailing vertex (V6$x$, V6$y$), and the coordinates of its virtual vertex (V0$x$, V6$y$) by using exclusive-OR operation. Because an even number of graphics overlaps one another in region 1E, the graphic within region 1E is deleted (FIG. 7).

Figure 8:
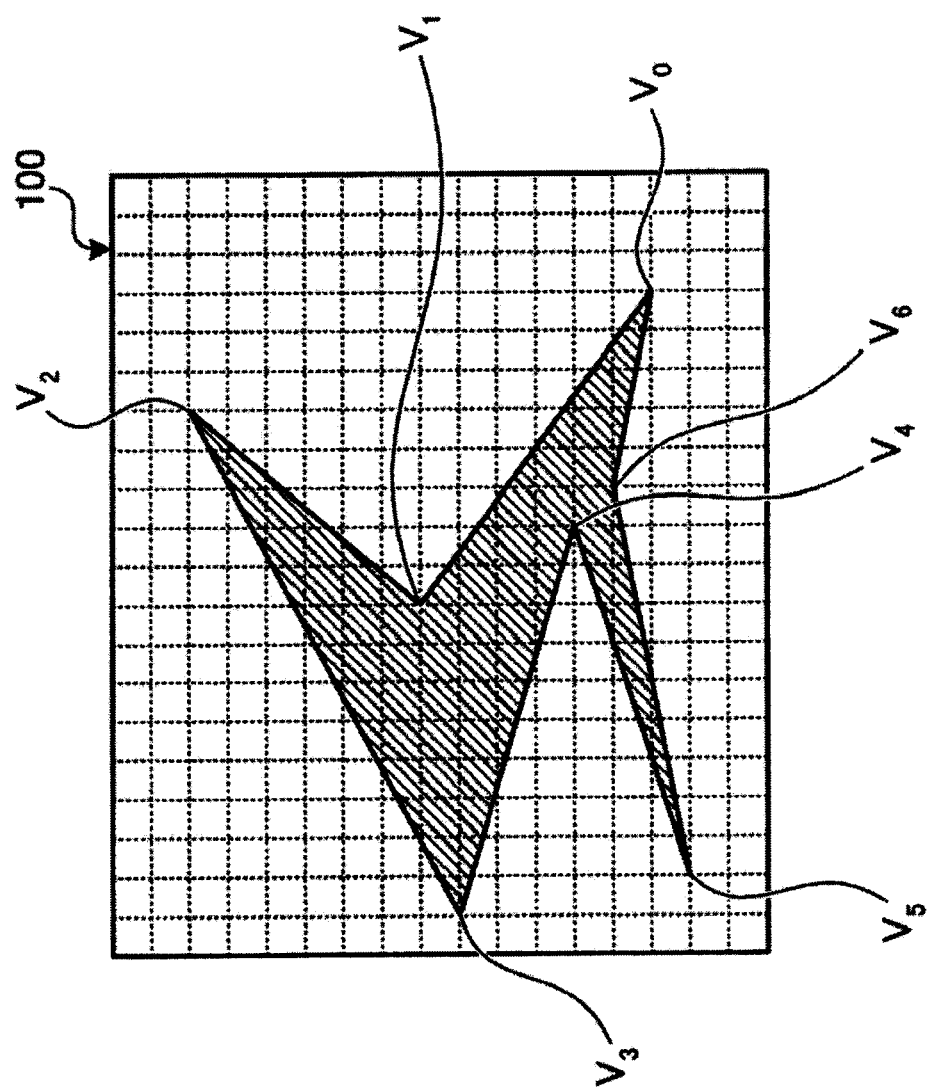
FIG. 8 is an illustration (8 of 8) showing the process for drawing the subject graphic by the graphics drawing apparatus according to the first embodiment.

In this way, the graphics drawing apparatus of the first embodiment generates virtual vertices V1' to V6' from input vertex coordinates and draws partial graphics in the stencil buffer area 100 on the basis of the vertices V0 to V6 and the virtual vertices V1' to V6' one after another each time vertex coordinates are input, thereby drawing a subject graphic having the vertices V0 to V6 in the stencil buffer area 100 (FIG. 8).

Figure 9:
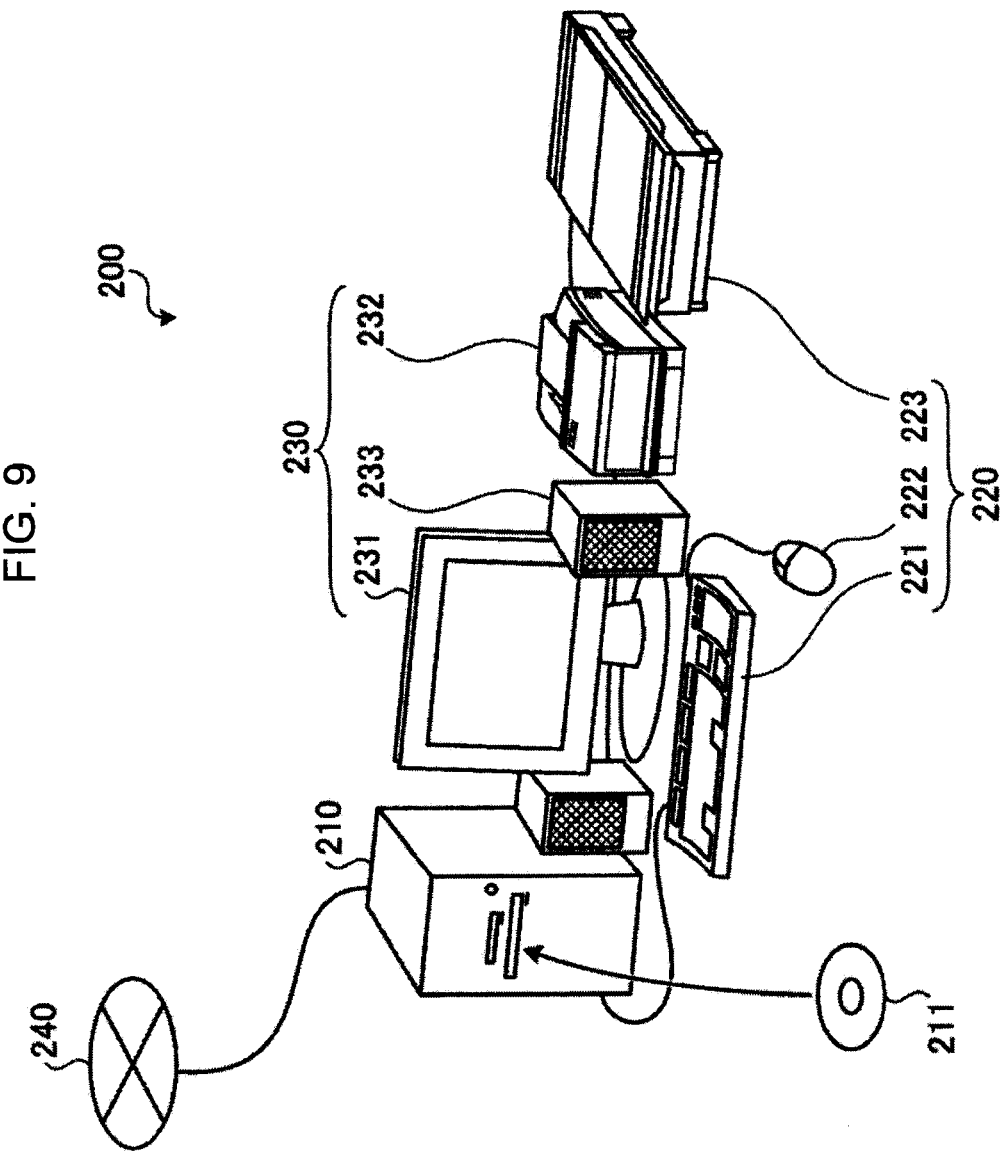
FIG. 9 illustrates a hardware configuration of a computer system according to the first embodiment.

A hardware configuration of a computer system according to the first embodiment will be described below. FIG. 9 illustrates a hardware configuration of a computer system according to the first embodiment.

In FIG. 9, the computer system 200 includes a computer main unit 210, input devices 220, and output devices 230 and can be connected to a network 240 such as a LAN, WAN, or the Internet through a router or a modem, not shown.

The computer system 200 includes a CPU, memory, and interface. The CPU controls the whole computer system 200. The memory includes a ROM, RAM, hard disk, optical disk 211, and flash memory. The memory is used by the CPU as a work area.

Various programs are stored in the memory. The programs are loaded in response to an instruction from the CPU. Reads and writes of data on the hard disk and the optical disk 211 are controlled by disk drives. The optical disk 211 and the flash memory are removable from the computer main unit 210. The interface controls inputs through the input devices 220, outputs through the output devices 230, and sends and receives data to and from the network 240.

The input devices 220 may be devices such as a keyboard 221, a mouse 222, and a scanner 223. The keyboard 221 has keys for inputting characters, numbers, commands, and the like, and is used for inputting data. The input devices 220 may include a touch-sensitive panel. The mouse 222 is used for moving a cursor, selecting a range, and moving and resizing windows, and the like. The scanner 223 optically reads an image. The read image is captured as image data and stored in the memory in the computer main unit 210. The scanner 223 may include OCR capabilities.

The output devices 230 may be devices such as a display 231, a printer 232, and speakers 233. The display 231 displays cursors, icons, and toolboxes and the like as well as data such as documents, images, and information about functions. The printer 232 prints image data and document data. The speakers 233 output sound such as sound effects and speech output.

The graphics drawing apparatus and the stencil buffer described above are implemented, for example, by a graphics LSI and memory provided inside the computer main unit 210, and store the shape of an image to be displayed on the display 231 on the basis of a sequence of vertex coordinates generated by an application installed on the computer main unit 210.

Figure 10:
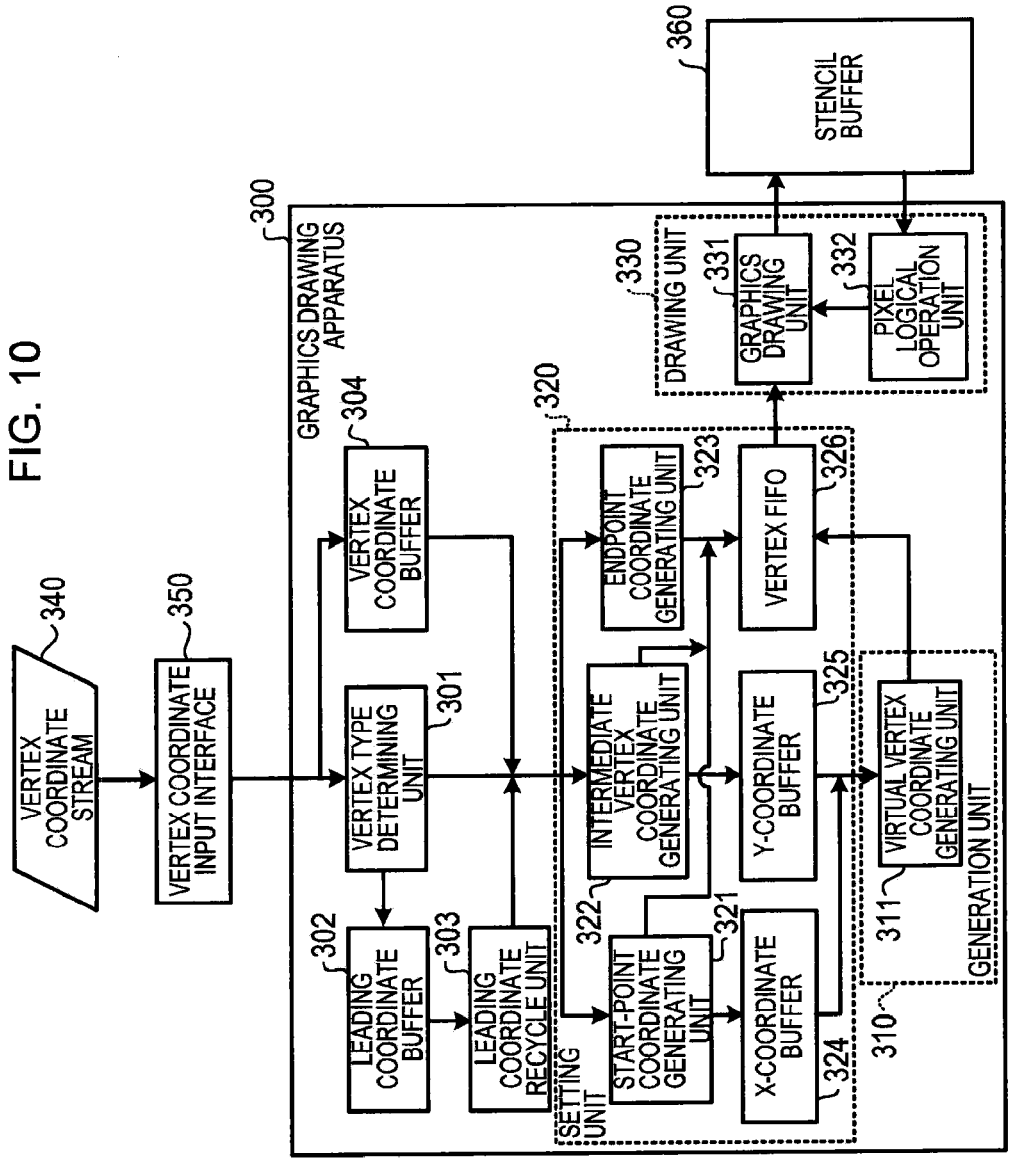
FIG. 10 illustrates a block diagram showing a functional configuration of the graphics drawing apparatus according to the first embodiment.

The first embodiment will be described below. A functional configuration of a graphics drawing apparatus according to the first embodiment will be described first. FIG. 10 is a block diagram showing a functional configuration of the graphics drawing apparatus according to the first embodiment. As shown in FIG. 10, the graphics drawing apparatus 300 according to the first embodiment includes a vertex type determining unit 301, a leading coordinate buffer 302, a leading coordinate recycle unit 303, a vertex coordinate buffer 304, a generation unit 310, a setting unit 320, and a drawing unit 330.

The graphics drawing apparatus 300 has the function of drawing a subject graphic based on a sequence of two-dimensional vertex coordinates generated by an application in a stencil buffer area in a stencil buffer 360 as the vertex coordinates are input one after another in the graphics drawing apparatus 300 as a vertex coordinate stream 340 through a vertex coordinate input interface 350. In particular, when coordinates of vertices V0 to V6 are input in sequence from a vertex coordinate stream 340 as shown in FIGS. 1 to 8, for example, the graphics drawing apparatus 300 draws a graphic having vertices V0 to V6 in the stencil buffer area 100 in the stencil buffer 360.

The vertex type determining unit 301 has the function of determining, on the basis of input vertex coordinates, the type of a vertex at the vertex coordinates. Examples of types of vertex coordinates include leading vertex, intermediate vertex, and trailing vertex coordinates. The leading vertex coordinates are the first vertex coordinates in a sequence of input vertex coordinates. For example, the coordinates of the vertex denoted by V0 in FIGS. 1 to 8 are the leading vertex coordinates.

The trailing vertex coordinates are the vertex coordinates at the end of a sequence of input vertex coordinates. For example, the coordinates of the vertex denoted by V6 in FIGS. 7 and 8 are the trailing vertex coordinates.

The intermediate vertex coordinates are the vertex coordinates other than the leading and trailing vertex coordinates in a sequence of input vertex coordinates. For example, the coordinates of the vertices denoted by V1 to V5 in FIGS. 1 to 8 are intermediate vertex coordinates. That is, each time the coordinates of a vertex are input, the vertex type determining unit 301 determines the type of the vertex coordinates: leading vertex, intermediate vertex, or trailing vertex coordinates.

In particular, the vertex type determining unit 301 can determine the type of vertex coordinates on the basis of a command indicating the start (such as a begin command) and a command indicating the end (such as an end command) as triggers, for example, if a sequence of vertex coordinates are input between such commands. If a sequence of vertex coordinates is input as an array, the vertex type determining unit 301 may determine the type on the basis of a combination of the starting value and ending value of an array index and a counter. The vertex type determining unit 301 may also identify effective start-point coordinates, which will be described later, as the type of vertices.

After determining the type of vertex the input vertex coordinates are, the vertex type determining unit 301 outputs the vertex coordinates to the leading coordinate buffer 302 and the setting unit 320 depending on the result of the determination. That is, vertex coordinates identified as leading vertex coordinates (for example the coordinates of vertex V0) are output to both of the leading coordinate buffer 302 and the setting unit 320; intermediate vertex coordinates (for example the coordinates of vertices V1 to V5) are output to the setting unit 320.

The leading coordinate buffer 302 has the function of storing vertex coordinates determined by the vertex type determining unit 301 as leading vertex coordinates. The leading vertex coordinates stored in the leading coordinate buffer 302 are held there until completion of drawing of the subject graphic. Then the vertex coordinates stored in the leading coordinate buffer 302 are output to the leading coordinate recycle unit 303. The leading coordinate buffer 302 may also store effective start-point coordinates (for example the coordinates of C0 in FIGS. 12 to 20 and the coordinates of $V_{-1}$ in FIGS. 23 to 28), which will be described later, in addition to the leading vertex coordinates.

The leading coordinate recycle unit 303 has the function of recycling vertex coordinates determined by the vertex type determining unit 301 as leading vertex coordinates. Leading vertex coordinates input in the leading coordinate recycle unit 303 are output to an endpoint coordinate generating unit 323, which will be described later.

The vertex coordinate buffer 304 has the function of storing the coordinates of one vertex in a sequence of input vertex coordinates at a time. The vertex coordinates stored in the vertex coordinate buffer 304 are overwritten each time new vertex coordinates are input. In particular, the vertex coordinates input immediately before the currently input vertex coordinates (hereinafter referred to as the "previous vertex coordinates") are stored. For example, when the coordinates of vertex V2 are input as new vertex coordinates, the coordinates of vertex V1 input immediately before V2 are stored in the vertex coordinate buffer 304.

The generation unit 310 has the function of generating on memory the coordinates of each vertex and virtual vertex coordinates generated by converting the X-coordinate of the vertex coordinates to the X-coordinate of the leading vertex coordinates as a sequence of vertex coordinates is input. For example, the generation unit 310 generates the coordinates of each vertex in a sequence of vertex coordinates input from a vertex coordinate stream 340 and the virtual vertex coordinates of that vertex on the basis of the sequence of vertex coordinates.

In particular, the generation unit 310 includes a virtual vertex coordinate generating unit 311. The virtual vertex coordinate generating unit 311 has the function of generating virtual vertex coordinates on the basis of the X-coordinate (for example V0X) of the leading vertex coordinates stored in an X-coordinate buffer 324 provided in the setting unit 320, which will be described later, and the Y-coordinate (for example V1y) of intermediate vertex coordinates stored in a Y-coordinate buffer 325, and outputting the generated virtual vertex coordinates to the setting unit 320. Specifically, for example, the virtual vertex coordinate generating unit 311 converts the X-coordinate of input vertex coordinates to the X-coordinate of the leading vertex coordinates to generate virtual vertex coordinates for the input vertex coordinates.

More specifically, when the coordinates of vertices V0 to V6 are input as a sequence of vertex coordinates as shown in FIGS. 1 to 8, the generation unit 310 generates the coordinates of vertices V0 to V6 and the virtual vertex coordinates of virtual vertices V1' to V6' in the stencil buffer area 100 in the stencil buffer 360.

The setting unit 320 has the function of setting the coordinates of two vertices of a partial graphic that are to be created as the coordinates of two adjacent vertices in sequence starting form the leading vertex, and after setting the coordinates of the trailing vertex, setting the coordinates of the two vertices of a partial graphic to be generated as the leading and trailing vertex coordinates. Specifically, for example, the setting unit 320 sets the coordinates of two vertices of a partial graphic to be drawn and their virtual vertex coordinates in association and outputs them to the drawing unit 330.

In particular, when the setting unit 320 receives vertex coordinates and their virtual vertex coordinates generated by the generation unit 310, the setting unit 320 sets the vertex coordinates as start-point coordinates, intermediate vertex coordinates, or endpoint coordinates and sets the coordinates of the vertex, the coordinates of the vertex adjacent to the vertex, and the their virtual vertex coordinates in association, then outputs them to the drawing unit 330.

After all partial graphics according to the sequence of input vertex coordinates are drawn, the setting unit 320 sets the leading and trailing vertex coordinates in association to set the vertex coordinates of the last partial graphic. The last partial graphic is the partial graphic that has the endpoint coordinates (that is, the start point coordinates), trailing vertex coordinates, and virtual vertex coordinates for the trailing vertex coordinates as its vertices.

More specifically, the setting unit 320 sets the coordinates of two vertices of a partial graphic to be created in association like V0 and V1, V1 and V2, V2 and V3, and so on in sequence starting from V0, for example as shown in FIGS. 1 to 8. After setting the coordinates of the trailing vertex, V6, the setting unit 320 sets V6 and V0 in association.

The setting unit 320 includes specifically a start-point coordinate generating unit 321, an intermediate vertex coordinate generating unit 322, an endpoint coordinate generating unit 323, an X-coordinate buffer 324, a Y-coordinate buffer 325, and a vertex FIFO (First In, First Out) 326.

The start-point coordinate generating unit 321 has the function of generating start-point coordinates from input vertex coordinates. The start-point coordinates are the coordinates of the base vertex on which to base the drawing of a subject graphic. For example, for the leading vertex coordinates in input vertex coordinates, the start-point coordinate generating unit 321 sets the leading vertex coordinates as the start-point coordinates, thus generating the start-point coordinates. After generating the start-point coordinates, the start-point coordinate generating unit 321 outputs the start-point coordinates to the vertex FIFO 326.

The intermediate vertex coordinate generating unit 322 has the function of generating intermediate vertex coordinates. The intermediate vertex coordinates are the vertex coordinates of a subject graphic other than the start-point coordinates. Specifically, the intermediate vertex coordinate generating unit 322 sets the vertex coordinates in input vertex coordinates other than the leading vertex coordinates as the intermediate vertex coordinates, thus generating the intermediate vertex coordinates. After generating the intermediate vertex coordinates, the intermediate vertex coordinate generating unit 322 outputs the intermediate vertex coordinates to the vertex FIFO 326.

The endpoint coordinate generating unit 323 has the function of generating endpoint coordinates from input vertex coordinates. The endpoint coordinates are the last vertex coordinates input and are coincident with the start-point coordinates. Specifically, the endpoint coordinate generating unit 323 sets vertex coordinates input from the leading coordinate recycle unit 303, for example, as the endpoint coordinates, thus generating the endpoint coordinates. After generating the endpoint coordinates, the endpoint coordinate generating unit 323 outputs the endpoint coordinates to the vertex FIFO 326.

The X-coordinate buffer 324 has the function of storing the X-coordinate of start-point coordinates. Specifically, the X-coordinate buffer 324 stores the X-coordinate of start-point coordinates with respect to the X-axis representing the direction in which consecutive memory addresses are arranged. The Y-coordinate buffer 325 has the function of storing the Y-coordinates of intermediate vertex coordinates. Specifically, the Y-coordinate buffer 325 stores the Y-coordinates of intermediate vertex coordinates with respect to the Y-axis representing the direction orthogonal to the X-axis.

The vertex FIFO 326 has the function of storing vertex coordinates input from the coordinate generating units 311 and 321 to 323 and outputting the stored vertex coordinates to the drawing unit 330 at a predetermined timing. Specifically, the vertex coordinates stored in the vertex FIFO 326 are output to the drawing unit 330 in the order in which they were stored, in response to an instruction to start drawing, for example. More specifically, the vertex FIFO 326 stores the coordinates of vertices of a partial graphic being drawn and their virtual vertex coordinates in the order in which they are input or generated and, once all vertex coordinates of the partial graphic to be drawn that are to be created and their virtual vertex coordinates have been stored, outputs the vertex coordinates and their virtual vertex coordinates to the drawing unit 330 in association.

More specifically, when the partial graphic shown in FIG. 2 is to be drawn, the vertex FIFO 326 outputs the coordinates of vertices V1 and V2 and their virtual vertex coordinates V1' and V2' to the drawing unit 330 at the time when all of these vertex coordinates and virtual vertex coordinates have been stored.

The drawing unit 330 has the function of providing a graphic by a drawing process and a deleting process. The drawing process is a process in which a partial graphic defined by the coordinates of two vertices and their virtual vertex coordinates set by the setting unit 320 is drawn on memory. The deleting process is a process in which, if a partial graphic drawn by the drawing process overlaps a part or all of a partial graphic already created, the overlapping portion is deleted from memory.

For example, the drawing and deleting processes are performed by using exclusive-OR operation and a region in which an odd number of partial graphics drawn by the drawing process overlap one another is drawn, and an overlapping region in which an even number of partial graphics overlaps one another is deleted by the deleting process.

More specifically, for example, the drawing unit 330 draws a partial graphic having as its vertices the coordinates of two adjacent vertices (for example the coordinates of vertices V2 and V3) and their virtual vertex coordinates (for example the virtual vertex coordinates of virtual vertices V2' and V3') associated and input by the setting unit 320 as shown in FIG. 3, and deletes an overlapping portion (for example 1A) from the stencil buffer area 100 in the stencil buffer 360.

The drawing unit 330 includes specifically a graphics drawing unit 331 and a pixel logical operation unit 332. The graphics drawing unit 331 has the function of drawing a partial graphic, defined by vertex coordinates and their virtual vertex coordinates, from the vertex coordinates and the virtual vertex coordinates stored in the vertex FIFO 326. Specifically, for example, the drawing unit 330 uses vertex coordinates and their virtual vertex coordinates associated by the setting unit 320 to draw a closed polygon having the vertex coordinates and the virtual vertex coordinates as its vertices in the stencil buffer area 100 in the stencil buffer 360.

The pixel logical operation unit 332 has the function of performing exclusive-OR operation on partial graphics drawn by the graphics drawing unit 331. The pixel logical operation unit 332 outputs the result of the operation to the graphics drawing unit 331, which then draws a graphic based on the result of the operation. Specifically, in a region in which an odd number of partial graphics drawn by the graphics drawing unit 331 overlaps one another, the graphic conforming to the region is drawn; in a region in which an even number of partial graphics overlaps one another, the graphic conforming to the region is deleted.

Figure 11:
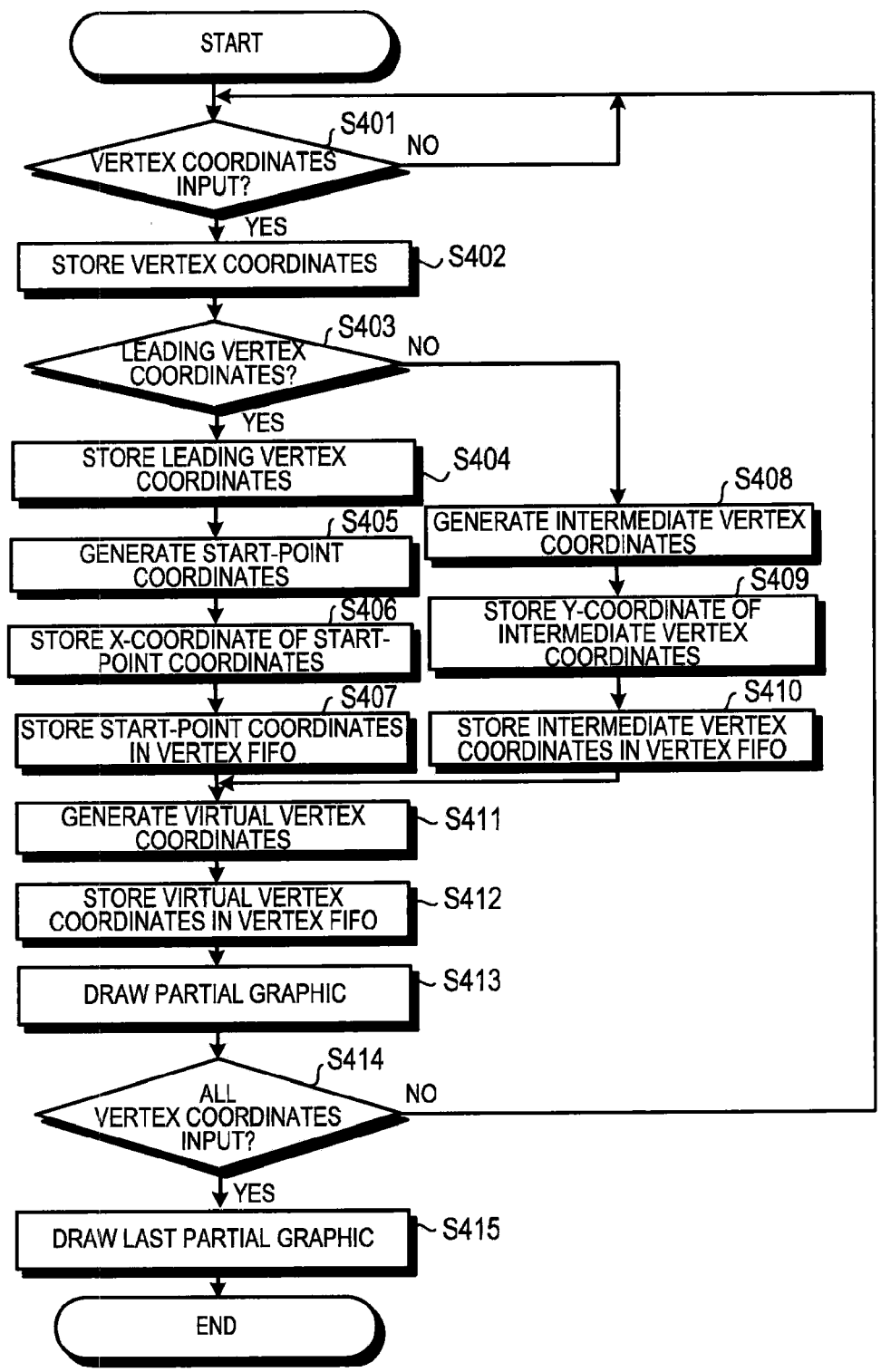
FIG. 11 illustrates a flowchart showing a procedure performed by the graphics drawing apparatus according to the first embodiment.

A process procedure performed by the graphics drawing apparatus 300 according to the first embodiment will be described next. FIG. 11 is a flowchart showing a process procedure performed by the graphics drawing apparatus according to the first embodiment. The process in the flowchart shown in FIG. 11 is started when the graphics drawing apparatus 300 receives an instruction to draw a subject graphics from an application, for example.

The graphics drawing apparatus 300 first waits for input of the coordinates of a vertex (step S401: a negation loop). In particular, the graphics drawing apparatus 300 waits until the coordinates of a vertex are input in the graphics drawing apparatus 300 through the vertex coordinate input interface 350 from a vertex coordinate stream 340 generated by an application, for example.

When the coordinates of a vertex are input at step S401 (step S401: Yes), the graphics drawing apparatus 300 stores the vertex coordinates (step S402). In particular, the graphics drawing apparatus 300 stores the input vertex coordinates in the vertex coordinate buffer 304.

Then, the graphics drawing apparatus 300 determines whether or not the input vertex coordinates are the leading vertex coordinates in a sequence of input coordinates (step S403). In particular, the graphics drawing apparatus 300 makes the determination by determining the type of the input vertex coordinates by the vertex type determining unit 301. When it is determined at step S403 that the input vertex coordinates are the leading vertex coordinates (step S403: Yes), the process proceeds to step S404; otherwise (step S403: No), the process proceeds to step S408.

When it is determined at step S403 that the input vertex coordinates are the leading vertex coordinates (step S403: Yes), the leading vertex coordinates are stored (step S404). In particular, the graphics drawing apparatus 300 stores the leading vertex coordinates determined by the vertex type determining unit 301 as the leading vertex coordinates in the leading coordinate buffer 302.

After the leading vertex coordinates are stored at step S404, start-point coordinates are generated from the stored leading vertex coordinates (step S405). In particular, the graphics drawing apparatus 300 generates the start-point coordinates by the start-point coordinate generating unit 321 from the leading vertex coordinates stored in the leading coordinate buffer 302. More specifically, if the leading vertex coordinates are (V0$x$, V0$y$), (V0$x$, V0$y$) are generated as the start-point coordinates.

After the start-point coordinates are generated at step S405, the X-coordinate of the generated start-point coordinates is stored (step S406). In particular, the graphics generating apparatus 300 stores the X-coordinate of the start-point coordinates generated by the start-point coordinate generating unit 321 in the X-coordinate buffer 324. More specifically, for example if the start-point coordinates are (V0$x$, V0$y$), the X-coordinate V0$x$ of the start-point coordinates (V0$x$, V0$y$) is stored in the X-coordinate buffer 324.

After the X-coordinate of the start-point coordinates is stored at step S406, the start-point coordinates are stored in the vertex FIFO (step S407). In particular, after storing the X-coordinate of the start-point coordinates in the X-coordinate buffer 324, the graphics drawing apparatus 300 outputs the start-point coordinates to the vertex FIFO 326 to store them in the vertex FIFO 326. More specifically, if the start-point coordinates are (V0$x$, V0$y$), the start-point coordinates (V0$x$, V0$y$) are stored in the vertex FIFO 326.

On the other hand, if it is determined at step S403 that the input vertex coordinates are not the leading vertex coordinate (step S403: No), intermediate vertex coordinates are generated from the vertex coordinates (step S408). In particular, the graphics generating apparatus 300 generates intermediate vertex coordinates by the intermediate vertex coordinate generating unit 322 from the vertex coordinates determined as not being the leading vertex coordinates. More specifically, for example if the vertex coordinates determined as not being the leading vertex coordinates are (V1$x$, V1$y$), intermediate vertex coordinates (V1$x$, V1$y$) are generated from the vertex coordinates (V1$x$, V1$y$) determined as not being the leading vertex coordinates.

After generating the intermediate vertex coordinates at step S408, the Y-coordinate of the generated intermediate vertex coordinates is stored (step S409). In particular, the graphics drawing apparatus 300 stores the Y-coordinate of the intermediate vertex coordinates generated by the intermediate vertex coordinate generating unit 322 in the Y-coordinate buffer 325. More specifically, for example if the intermediate vertex coordinates are (V1$x$, V1$y$), the Y-coordinate V1$y$ of the intermediate vertex coordinates (V1$x$, V1$y$) is stored in the Y-coordinate buffer 325.

After the Y-coordinate of the intermediate vertex coordinates is stored at step S409, the intermediate vertex coordinates are stored in the vertex FIFO (step S410). In particular, after storing the Y-coordinate of the intermediate vertex coordinates in the Y-coordinate buffer 325, the graphics drawing apparatus 300 outputs the intermediate vertex coordinates to the vertex FIFO 326 to store them in the vertex FIFO 326. More specifically, if the intermediate vertex coordinates are (V1$x$, V1$y$), (V1$x$, V1$y$) are stored in the vertex FIFO 326.

After the start-point coordinates and the intermediate vertex coordinates are stored in the vertex FIFO at steps S407 and S410, respectively, virtual vertex coordinates are generated from the X-coordinate of the start-point coordinates and the Y-coordinate of the intermediate vertex coordinates (step S411). In particular, the graphics drawing apparatus 300 generates virtual vertex coordinates by the virtual vertex coordinate generating unit 311 from the X-coordinate of the start-point coordinates stored in the X-coordinate buffer 324 and the Y-coordinate of the intermediate vertex coordinates stored in the Y-coordinate buffer 325. More specifically, for example if the X-coordinate stored in the X-coordinate buffer 324 is V0$x$ and the Y-coordinate stored in the Y-coordinate buffer 325 is V1$y$, the virtual vertex coordinates (V0$x$, V1$y$) of virtual vertex V1' are generated.

After the virtual vertex coordinates are generated at step S411, the generated virtual vertex coordinates are stored in the vertex FIFO (step S412). In particular, the graphics drawing apparatus 300 generates the virtual vertex coordinates by the virtual vertex coordinate generating unit 311 from the X-coordinate stored in the X-coordinate buffer 324 and the Y-coordinate stored in the Y-coordinate buffer 325 and outputs the virtual vertex coordinates to the vertex FIFO 326, thereby storing the virtual vertex coordinates in the vertex FIFO 326. More specifically, if the virtual vertex coordinates are (V0$x$, V1$y$), (V0$x$, V1$y$) are stored in the vertex FIFO 326.

At step S412, a partial graphic is drawn on the basis of the vertex coordinates stored in the vertex FIFO (step S413). In particular, the graphics drawing apparatus 300 outputs the coordinates of two adjacent vertices of a partial graphic to be created and their virtual vertex coordinates that are stored in the vertex FIFO 326 to the drawing unit 330, which then draws a partial graphic in the stencil buffer area in the stencil buffer 360. More specifically, for example, if the vertex coordinates (V0$x$, V0$y$), (V1$x$, V1$y$), and (V0$x$, V1$y$) are stored in the vertex FIFO 326, a partial graphic having vertices V0, V1, and V1' is drawn in the stencil buffer area 100.

After the partial graphic is drawn at step S413, determination is made as to whether all vertex coordinates have been input (S414). In particular, the graphics drawing apparatus 300 determines that all vertex coordinates have been input when vertex coordinates that are determined by the vertex type determining unit 301 as the coordinates of the trailing vertex have been input.

If it is determined at step S414 that all vertex coordinates have been input (step S414: Yes), the last partial graphic is drawn (step S415). After the last partial graphic is drawn, the process will end. In particular, the last partial graphic is drawn based on the endpoint coordinates generated by the endpoint coordinate generating unit 323, the coordinates of the trailing vertex, and the virtual vertex coordinates for the coordinates of the trailing vertex. If it is determined that not all vertex coordinates have been input (step S414: No), the process returns to step S401 and the same process sequence is repeated.

In this way, the graphics drawing apparatus 300 according to the first embodiment generates the coordinates of virtual vertices V1' to V6' that are not contained in a vertex coordinate stream 340 for the sake of convenience in order to draw a subject graphic, and constructs the subject graphic with partial graphics, each having the coordinates of two adjacent vertices and the virtual vertex coordinates generated for the coordinates. Therefore, the scan lines involved in the drawing can be reduced in number to the scan lines between every two adjacent vertices, the ratio of pixels that have consecutive memory addresses can be increased, and therefore the number of random accesses to a VRAM can be reduced and the rendering speed can be increased.

A second embodiment will be described next. In the second embodiment, drawing will be described in which clipping occurs in a subject graphic. The same components as those in the first embodiments will be labeled with the same reference numerals and the description of which will be omitted.

Clipping is a technique where rendering is performed for only a specified region (for example in a specified rectangle), details of which will be omitted herein since it is well known in the art. For example, when input vertex coordinates are not included in a specified region, namely a clipping region, lines are not drawn beyond the boundary of the clipping region to the vertices outside the clipping region but only the portion of the line included in the clipping area is drawn.

In the second embodiment, a graphics drawing apparatus generates effective vertex coordinates for those vertex coordinates in a sequence of input vertex coordinates that lie outside a clipping region and performs drawing based on the generated effective vertex coordinates.

In particular, if the leading vertex coordinates in a sequence of input vertex coordinates lie outside the clipping region, effective start-point coordinates are generated instead of the start-point coordinates of the first embodiment; if vertex coordinates of the other types lie outside the clipping region, effective intermediate vertex coordinates are generated instead of the intermediate vertex coordinates of the first embodiment.

Effective start-point coordinates are for example coordinates on the boundary of a clipping region set in a stencil buffer area, which are calculated on the basis of the coordinates of the first vertex included in the clipping region and the coordinates of the vertex immediately preceding the vertex. More specifically, for example, effective start-point coordinates are the coordinates of the intersection point between the line connecting the first vertex coordinates included in a clipping region to the vertex coordinates preceding the first vertex coordinates and the boundary of a clipping region.

Effective intermediate vertex coordinates are, for example, coordinates on the boundary of a clipping region set in the stencil buffer area that are calculated on the basis of the clipping region and the coordinates of two adjacent vertices. More specifically, effective intermediate vertex coordinates are for example the coordinates of the intersection point between the boundary of a clipping region and the line that connects two adjacent vertices.

Endpoint coordinates are set at the same coordinates as the effective start-point coordinates. That is, endpoint coordinates are coordinates on the boundary of a clipping region set in a stencil buffer area that are calculated on the basis of the first vertex coordinates included in the clipping region and the vertex coordinates preceding the vertex coordinates. More specifically, endpoint coordinates are the coordinates of the intersection point between the boundary of a clipping region set in a stencil buffer and the line that connects the first vertex coordinates included in the clipping region to the vertex preceding the vertex coordinates.

If leading vertex coordinates are not included in a clipping region and effective start-point coordinates are generated, and if it is determined by the graphics drawing apparatus that the trailing vertex coordinates in a sequence of input vertex coordinates have been input, the leading vertex coordinates are input as the next vertex coordinates and the endpoint coordinates are input as the last vertex coordinate input. That is, in the second embodiment, the last partial graphic will have the leading vertex coordinates, virtual vertex coordinates for the leading vertex coordinates, and endpoint coordinates.

Figure 12:
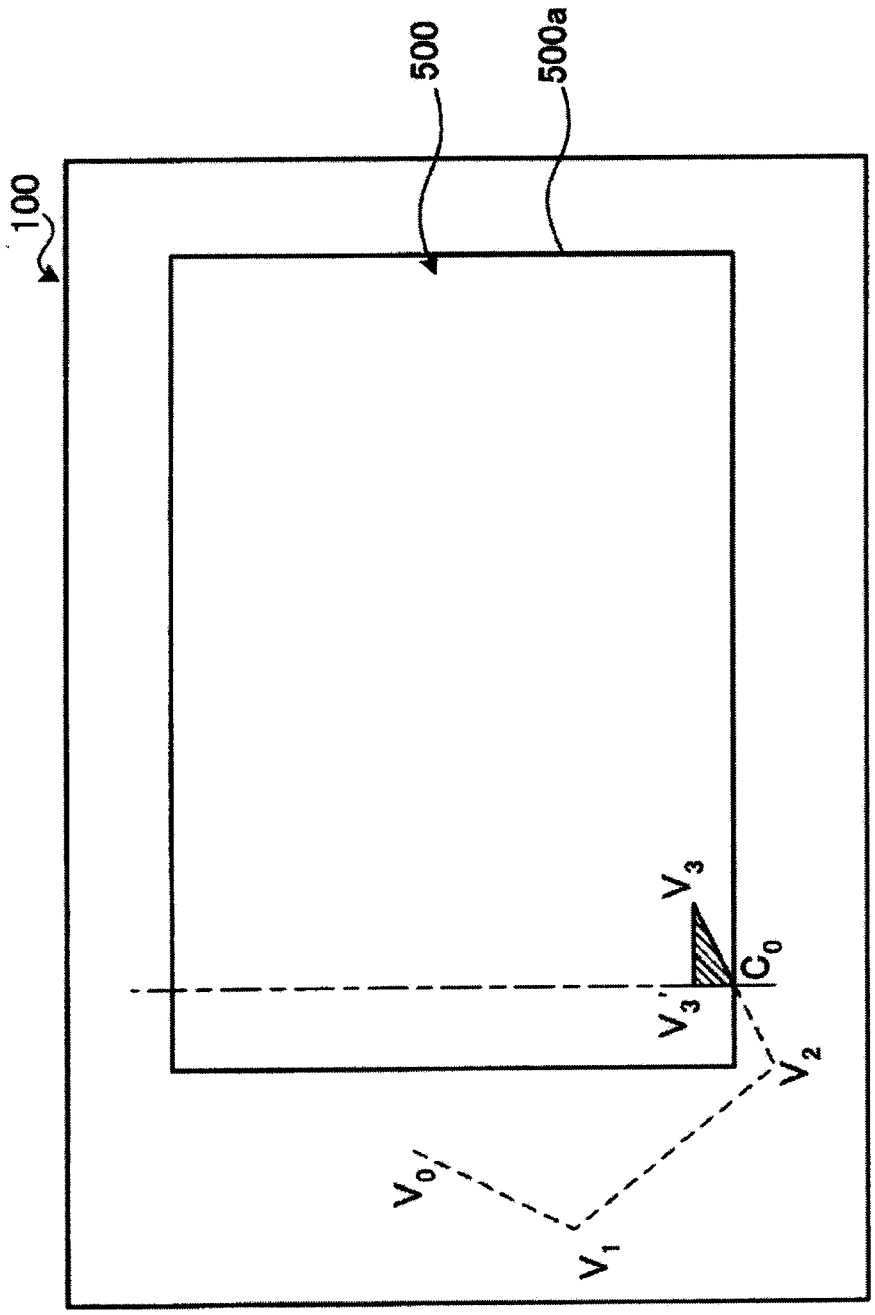
FIG. 12 is an illustration (1 of 9) showing a process for drawing a subject graphic by a graphics drawing apparatus according to a second embodiment.

A process for drawing a subject graphic by the graphics drawing apparatus according to the second embodiment will be described below. FIGS. 12 to 20 are illustrations (1 of 9) to (9 of 9) showing a process for drawing a subject graphic by the graphics drawing apparatus according to the second embodiment. In the second embodiment, a clipping region 500 is set beforehand in a stencil buffer area 100 as shown in FIG. 12.

First, the coordinates of vertices V0 to V2 are input one after another in the graphics drawing apparatus from a vertex coordinate stream through a vertex coordinate input interface. All of the coordinates of the vertices lie outside the clipping region 500. The coordinates (V3$x$, V3$y$) of vertex V3 are the first to enter the clipping region 500. At this point, the graphics drawing apparatus calculates the coordinates of the intersection point C0 between the line connecting V2 to V3 and the boundary 500$a$ of the clipping region 500, sets the intersection-point coordinates as effective start-point coordinates (C0$x$, C0$y$), and stores the X-coordinate of (C0$x$, C0$y$) in an X-coordinate buffer 324.

Then the graphics drawing apparatus generates the coordinates (C0$x$, V3$y$) of a virtual vertex V3' based on the effective start-point coordinates (C0$x$, C0$y$) and the intermediate vertex coordinates (V3$x$, V3$y$). That is, the virtual vertex coordinates (C0$x$, V3$y$) have the same X-coordinate as the effective start-point coordinates (C0$x$, C0$y$) and the same Y-coordinate as the intermediate vertex coordinates (V3$x$, V3$y$). After generating the virtual vertex coordinates (C0$x$, V3$y$), the graphics generating apparatus draws a partial graphic having vertices C0, V3', and V3 in a stencil buffer area 100 (FIG. 12).

Similarly, the coordinates of another intermediate vertex (V4$x$, V4$y$) are input in the graphics drawing apparatus. Because the coordinates (V4$x$, V4$y$) lie outside the clipping region 500, the graphics drawing apparatus calculates the coordinate (C1$x$, C1$y$) of the intersection point C1 between the line connecting V3 to V4 and boundary 500$a$ and generates the intersection-point coordinates (C1$x$, C1$y$) as effective intermediate vertex coordinates (C1$x$, C1$y$). After generating the effective intermediate vertex coordinates (C1$x$, C1$y$), the graphics drawing apparatus stores the Y-coordinates of (C1$x$, C1$y$) in a Y-coordinate buffer 325. The graphics drawing apparatus then generates the virtual coordinates (C0$x$, C1$y$) of a virtual vertex C1' based on the effective start-point coordinates (C0$x$, C0$y$) and the effective intermediate vertex coordinates (C1$x$, C1$y$).

Figure 13:
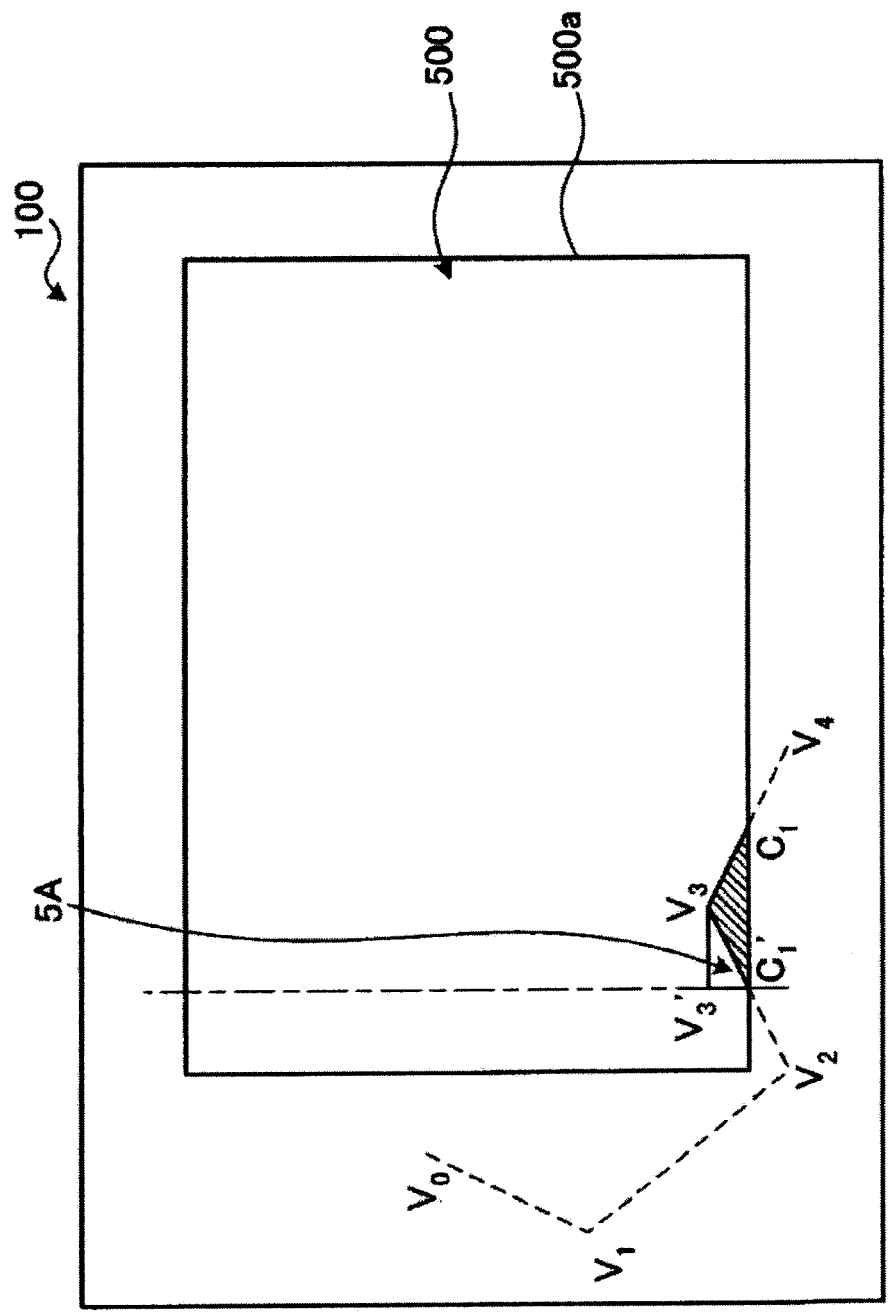
FIG. 13 is an illustration (2 of 9) showing the process for drawing the subject graphic by the graphics drawing apparatus according to the second embodiment.

That is, the virtual vertex coordinates (C0$x$, C1$y$) have the same X-coordinate as the effective start-point coordinates (C0$x$, C0$y$) and the same Y-coordinate as the effective intermediate vertex coordinates (C1$x$, C1$y$). After generating the coordinates (C0$x$, C1$y$) of the virtual vertex C1', the graphics drawing apparatus draws a partial graphics having vertices V3, V3', C1' and C1 in the stencil buffer area 100 by using exclusive-OR operation. Because an even number of graphics overlaps one another in region 5A, the graphic in region 5A is deleted (FIG. 13).

Then, the coordinates of another intermediate vertex (V5x, V5y) are input in the graphics drawing apparatus. Because (V5x, V5y) lie outside the clipping region 500, the graphics drawing apparatus calculates the coordinates (C2x, C2y) and (C3x, C3y) of the intersection points C2 and C3 between the line connecting V4 to V5 and the boundary 500a. After calculating (C2x, C2y) and (C3x, C3y), the graphics drawing apparatus generates the intersection-point coordinates (C2x, C2y) and (C3x, C3y) as effective intermediate vertex coordinates (C2x, C2y) and (C3x, C3y) and stores the Y-coordinates of the effective intermediate vertex coordinates (C2x, C2y) and (C3x, C3y) in the Y-coordinate buffer 325. The graphics drawing apparatus then generates the coordinates (C0x, C2y) and (C0x, C3y) of virtual vertices C2' and C3' based on the effective start-point coordinates (C0x, C0y) and the effective intermediate vertex coordinates (C2x, C2y) and (C3x, C3y), respectively.

Figure 14:
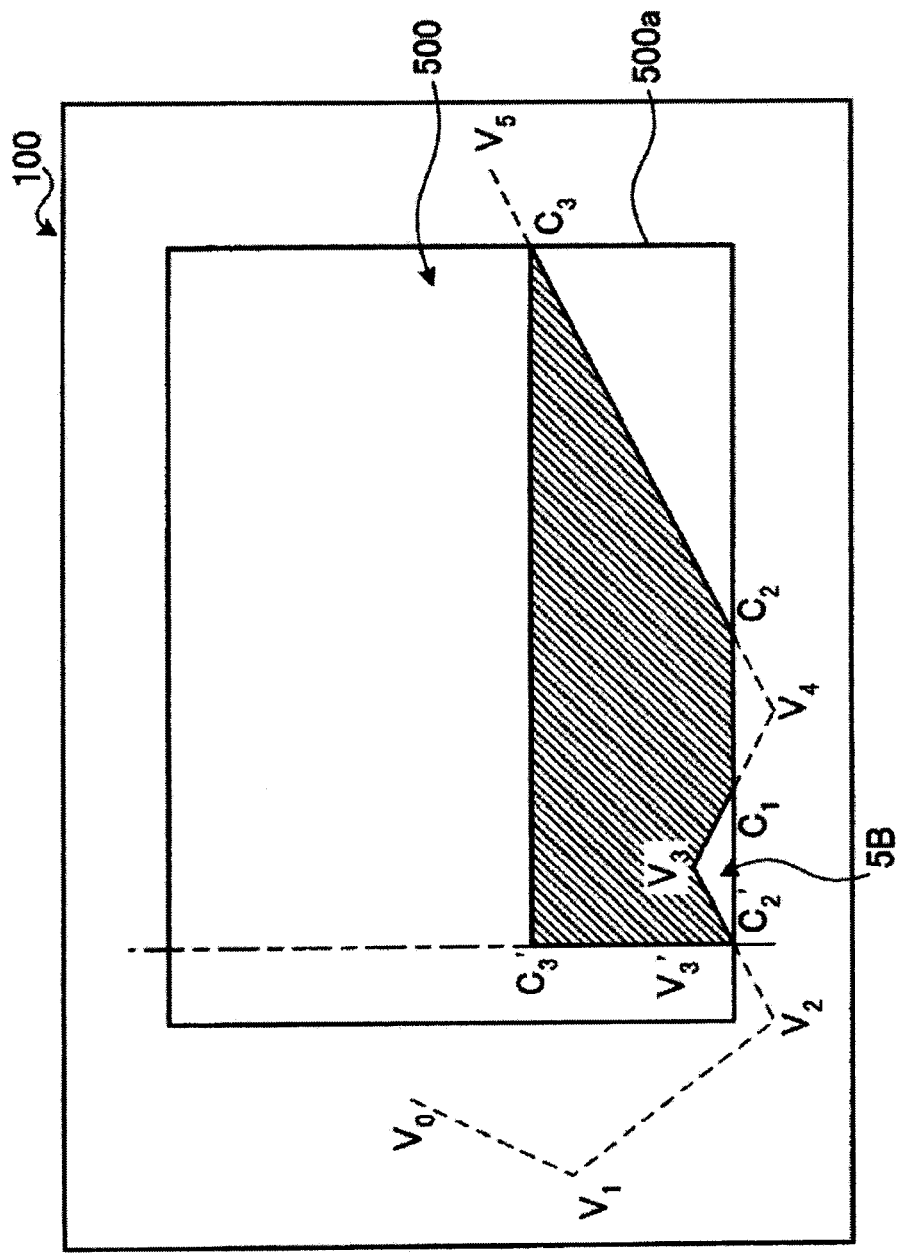
FIG. 14 is an illustration (3 of 9) showing the process for drawing the subject graphic by the graphics drawing apparatus according to the second embodiment.

That is, the virtual vertex coordinates (C0x, C2y) have the same X-coordinate as the effective start-point coordinates (C0x, C0y) and the same Y-coordinate as the effective intermediate vertex coordinates (C2x, C2y); the virtual vertex coordinates (C0x, C3y) have the same X-coordinate as the effective start-point coordinates (C0x, C0y) and the same Y-coordinate as the effective intermediate vertex coordinates (C3x, C3y). After generating the virtual vertex coordinates (C0x, C2y) and (C0x, C3y), the graphics drawing apparatus draws a partial graphic having vertices C2, C2', C3', and C3 in the stencil buffer area 100 by using exclusive-OR operation. Because an even number of graphics overlaps one another in region 5B, the graphic portion is deleted from region 5B (FIG. 14)

Then, the coordinates of another intermediate vertex (V6x, V6y) are input in the graphics drawing apparatus. Here, (V6x, V6y) are inside the clipping region 500 and thus the vertex enters the clipping region 500 from outside the clipping region 500. The graphics drawing apparatus calculates the coordinates (C4x, C4y) of the intersection point C4 between the line connecting V5 to V6 and the boundary 500a. After calculating (C4x, C4y), the graphics drawing apparatus generates the effective intermediate vertex coordinates (C4x, C4y) and stores the Y-coordinates of (C4x, C4y) in the Y-coordinate buffer 325. The graphics drawing apparatus then generates the virtual vertex coordinates (C0x, C4y) of a virtual vertex C4' based on the effective start-point coordinates (C0x, C0y) and the effective intermediate vertex coordinates (C4x, C4y).

Figure 15:
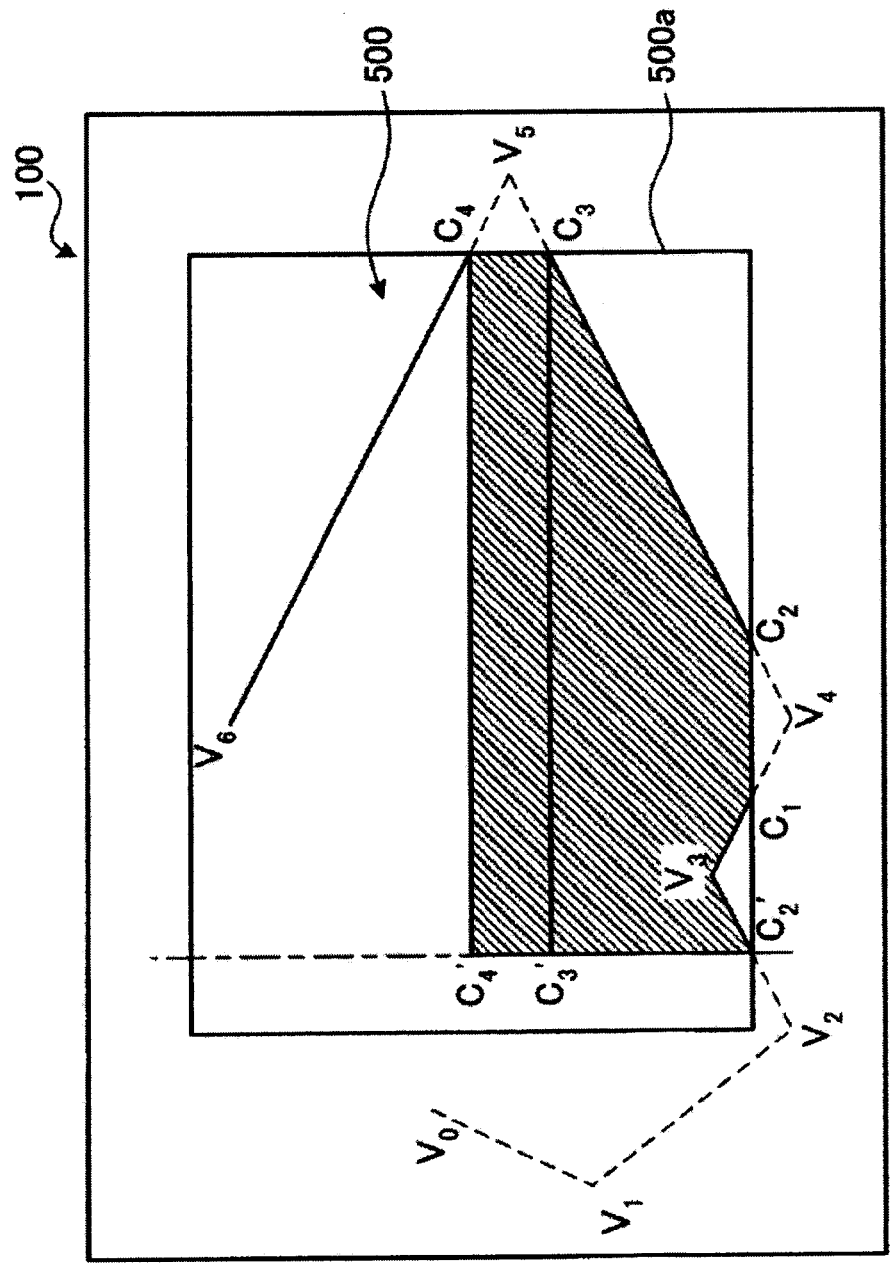
FIG. 15 is an illustration (4 of 9) showing the process for drawing the subject graphic by the graphics drawing apparatus according to the second embodiment.

That is, the virtual vertex coordinates (C0x, C4y) have the same X-coordinate as the effective start-point coordinates (C0x, C0y) and the same Y-coordinate as the effective intermediate vertex coordinates (C4x, Cy4). After generating the virtual vertex coordinates (C0x, C4y), the graphics drawing apparatus draws a partial graphic having vertices C3, C3', C4', and C4 in the stencil buffer area 100 by using exclusive-OR operation (FIG. 15).

Figure 16:
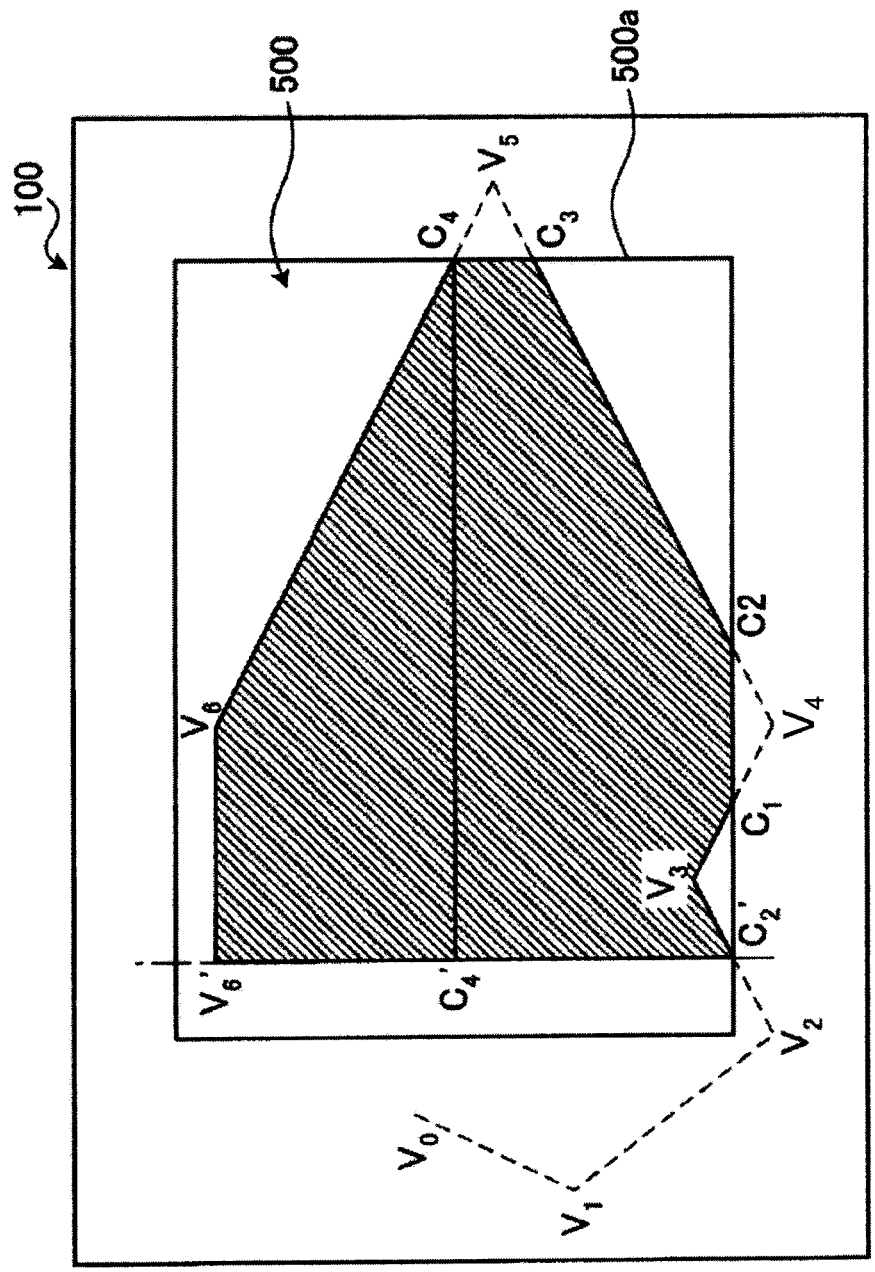
FIG. 16 is an illustration (5 of 9) showing the process for drawing the subject graphic by the graphics drawing apparatus according to the second embodiment.

Then, the graphics drawing apparatus generates the virtual vertex coordinates (C0x, V6y) of a virtual vertex V6' based on the effective start-point coordinates (C0x, C0y) and the intermediate vertex coordinates (V6x, V6y). That is, the virtual vertex coordinates (C0x, V6y) have the same X-coordinate as the effective start-point coordinates (C0x, C0y) and the same Y-coordinate as the intermediate vertex coordinates (V6x, V6y). After generating the virtual vertex coordinates (C0x, V6y), the graphics drawing apparatus draws a partial graphic having vertices C4, C4', V6', and V6 in the stencil buffer area 100 by using exclusive-OR operation (FIG. 16).

When coordinates (V6x, V6y) determined as the coordinates of the trailing vertex have been input, (V0x, V0y) are input in the graphics drawing apparatus again. Here, the coordinates (V0x, V0y) lie outside the clipping region 500, therefore the graphics drawing apparatus calculates the coordinates (C5x, C5y) of the intersection point C5' between the line connecting V6 to V0 and the boundary 500a. After calculating (C5x, C5y), the graphics drawing apparatus generates the effective intermediate vertex coordinates (C5x, C5y) and stores the Y-coordinate of (C5x, C5y) in the Y-coordinate buffer 325. The graphics drawing apparatus then generates the virtual vertex coordinates (C0x, C5y) of a virtual vertex C5' based on the effective start-point coordinates (C0x, C0y) and the intermediate vertex coordinates (C5x, C5y).

Figure 17:
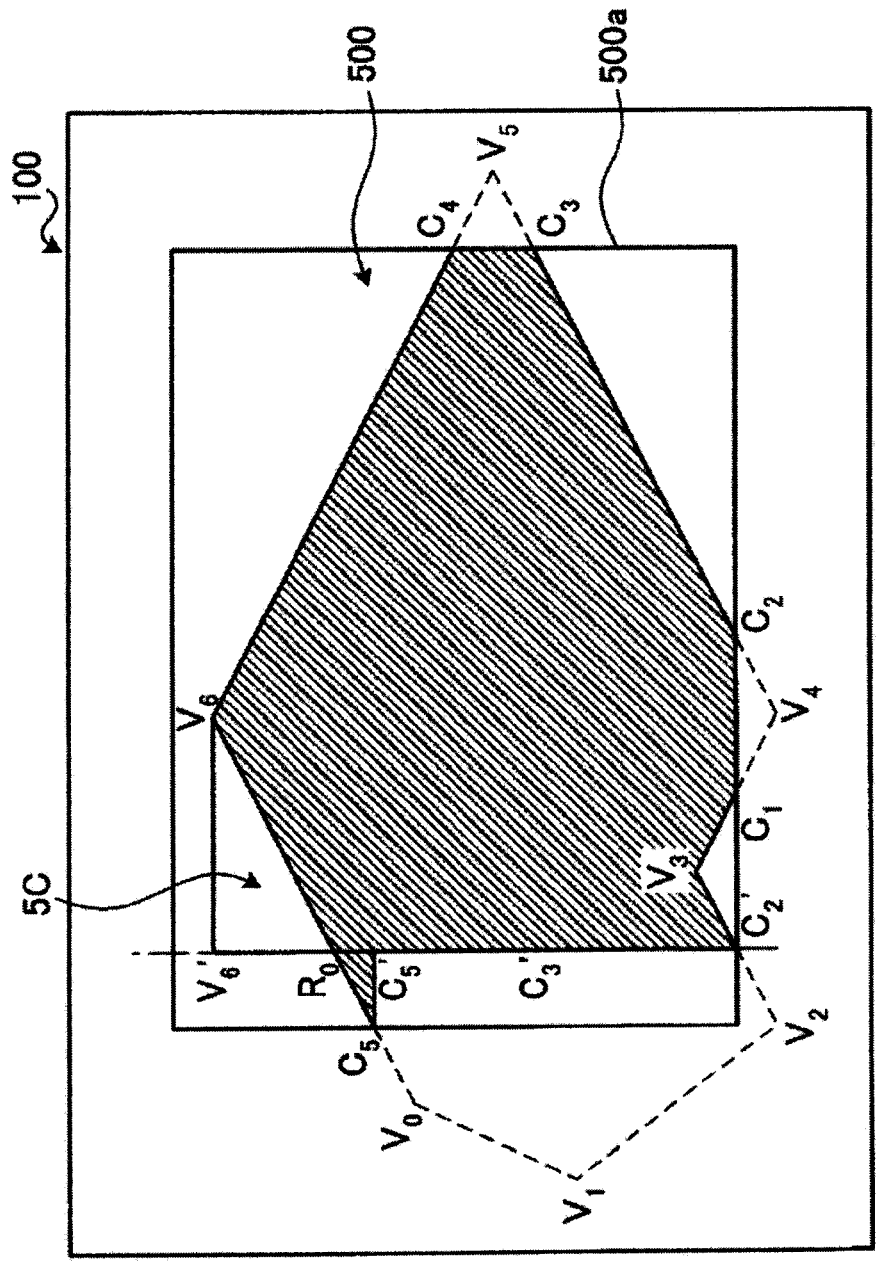
FIG. 17 is an illustration (6 of 9) showing the process for drawing the subject graphic by the graphics drawing apparatus according to the second embodiment.

The line connecting V6 and V0 intersects with the straight line extended from C0 (not shown in FIGS. 5 and 6 because C0 overlaps C2') in the Y-axis direction. Therefore the graphics drawing apparatus also calculates the coordinates of the intersection point R0 between the line connecting V6 to V0 and the straight line extended from C0 in the Y-axis direction. After generating the virtual vertex C5' and calculating the coordinates of the intersection point R0, the graphics drawing apparatus draws a partial graphic having vertices V6, V6', and R0 and a partial graphic having vertices C5, C5', and R0 in the stencil buffer area 100 by using exclusive-OR operation. Because an even number of graphics overlaps one another in region 5C, the graphic in region 5C is deleted (FIG. 17).

Figure 18:
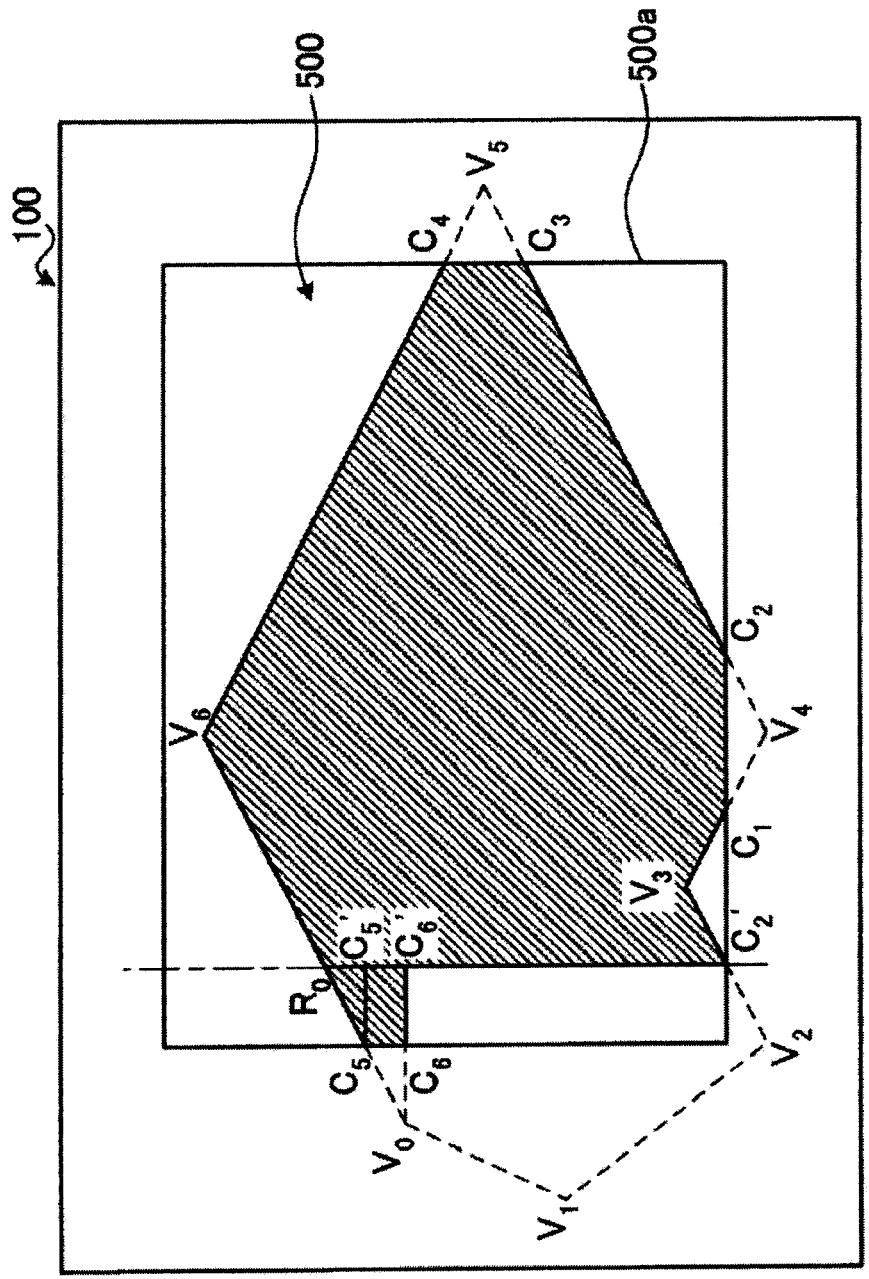
FIG. 18 is an illustration (7 of 9) showing the process for drawing the subject graphic by the graphics drawing apparatus according to the second embodiment.

Then, the graphics drawing apparatus calculates the coordinates (C6x, C6y) of the intersection point C6 between the line extended in the X-axis direction from V0 until the line intersects with the boundary 500a and the boundary 500a. After calculating (C6x, C6y), the graphics drawing apparatus generates the effective intermediate vertex coordinates (C6x, C6y) and stores the Y-coordinate of (C6x, C6y) in the Y-coordinate buffer 325. The graphics drawing apparatus then generates the virtual vertex coordinates (C0x, C6y) of the virtual vertex C6' based on the effective start-point coordinates (C0x, C0y) and the intermediate vertex coordinates (C6x, C6y). After generating the virtual vertex coordinates (C0x, C6y), the graphics drawing apparatus draws a partial graphic having vertices C5, C5', C6', and C6 in the stencil buffer area 100 by using exclusive-OR operation (FIG. 18).

Figure 19:
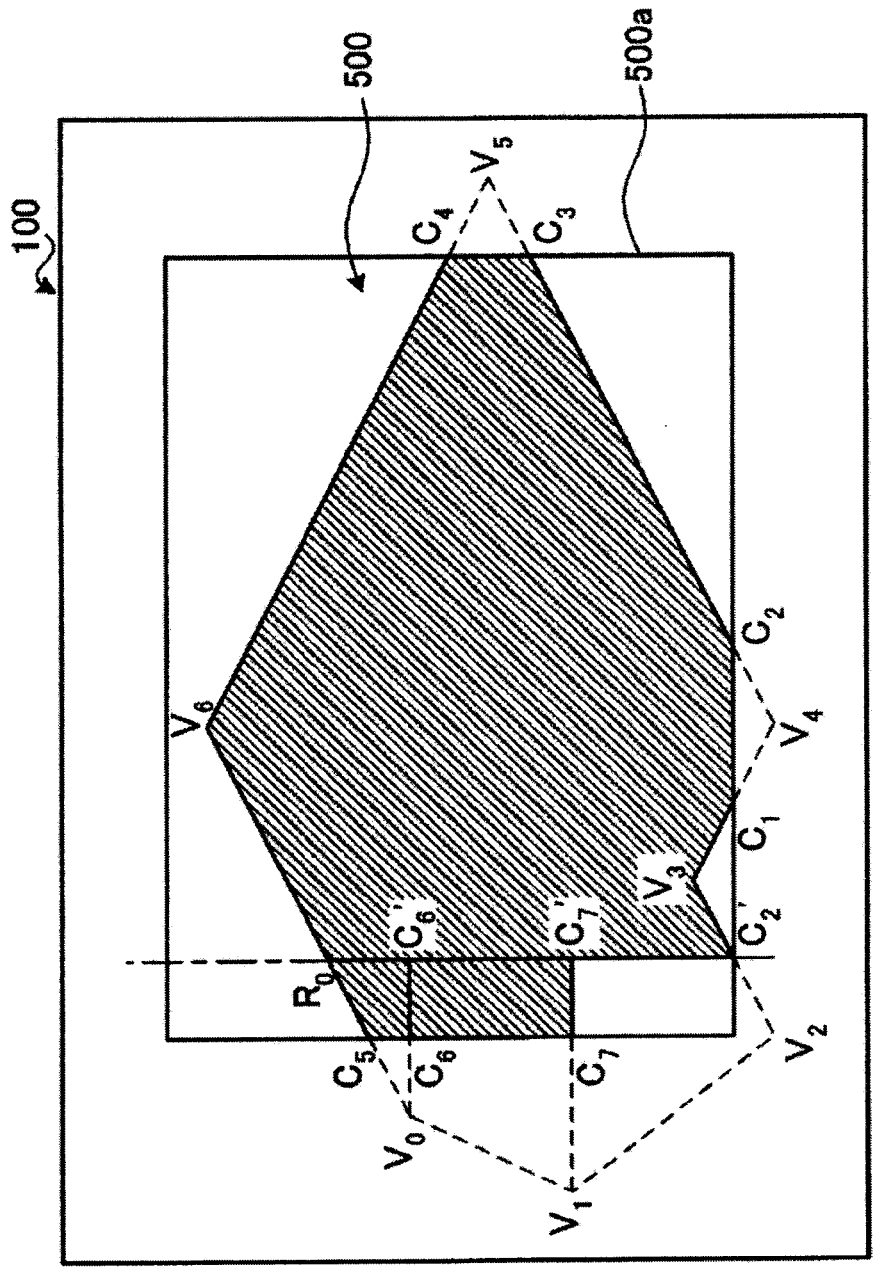
FIG. 19 is an illustration (8 of 9) showing the process for drawing the subject graphic by the graphics drawing apparatus according to the second embodiment.

Then, the graphics drawing apparatus calculates the coordinates (C7x, C7y) of the intersection point C7 between the line extended from V1 in the X-axis direction until the line intersects with the boundary 500a and the boundary 500a. After calculating (C7x, C7y), the graphics drawing apparatus generates the effective intermediate vertex coordinates (C7x, C7y) and stores the Y-coordinate of (C7x, C7y) in the Y-coordinate buffer 325. The graphics drawing apparatus then generates the virtual vertex coordinates (C0x, C7y) of a virtual vertex C7' based on the effective start-point coordinates (C0x, C0y) and the intermediate vertex coordinates (C7x, C7y). After generating the virtual vertex coordinates (C0x, C7y), the graphics drawing apparatus draws a partial graphic having vertices C6, C6', C7', and C7 in the stencil buffer area 100 by using exclusive-OR operation (FIG. 19).

Figure 20:
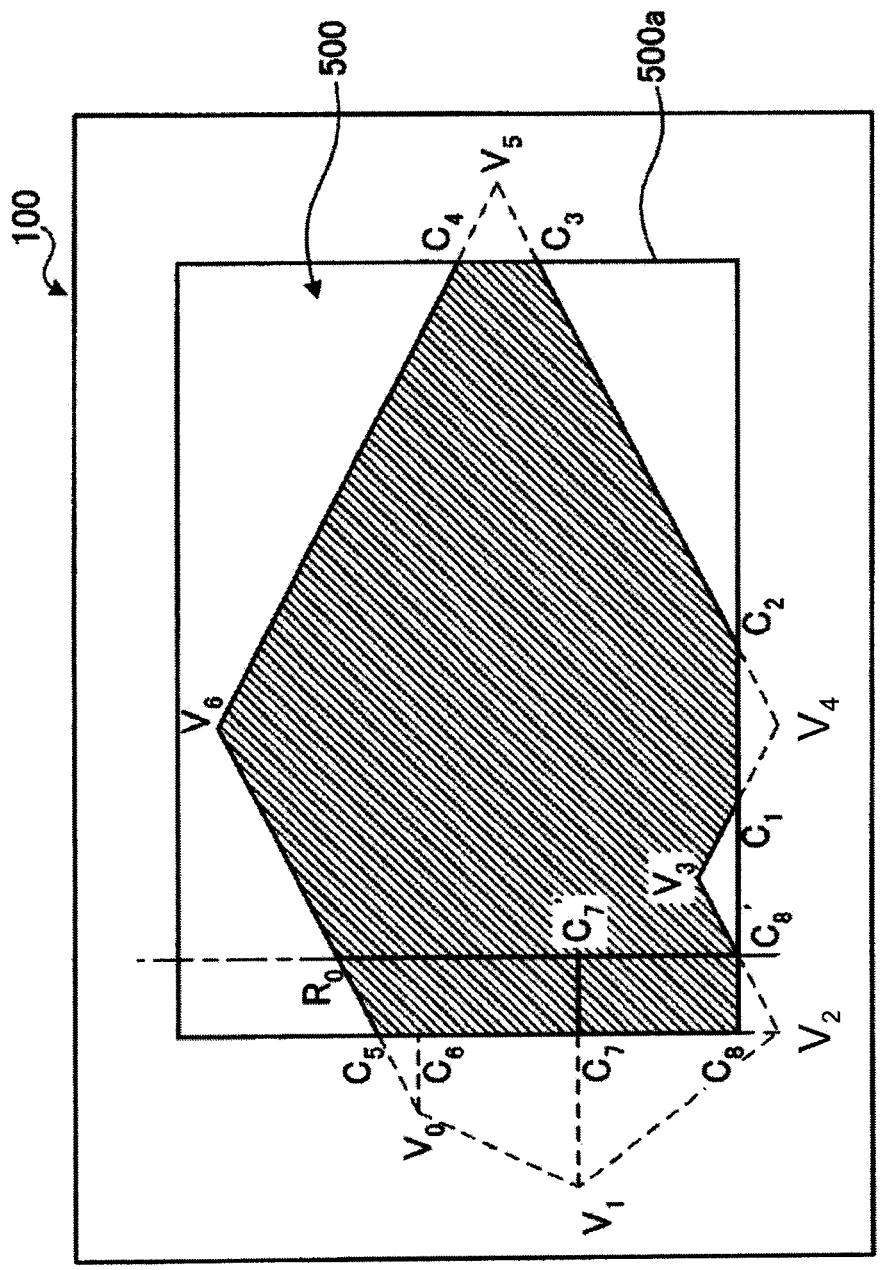
FIG. 20 is an illustration (9 of 9) showing the process for drawing the subject graphic by the graphics drawing apparatus according to the second embodiment.

Then, the graphics drawing apparatus calculates the coordinates (C8x, C8y) of C8 by geometric processing on V2, a detailed description of which will be omitted here since it is well known in the art. After calculating (C8x, C8y), the graphics drawing apparatus generates the effective intermediate vertex coordinates (C8x, C8y) and stores the Y-coordinate of (C8x, C8y) in the Y-coordinate buffer 325. The graphics drawing apparatus then generates the virtual vertex coordinates (C0x, C8y) of a virtual vertex C8' based on the effective start-point coordinates (C0x, C0y) and the intermediate vertex coordinates (C8x, C8y). After generating the virtual vertex coordinates (C0x, C8y), the graphics drawing apparatus draws a partial graphic having vertices C7, C7', C8', and C8 in the stencil buffer area 100 by using exclusive-OR operation (FIG. 20).

In this way, the graphics drawing apparatus according to the second embodiment generates effective vertex coordinates from input vertex coordinates and generates virtual vertex coordinates for the effective vertex coordinates, thereby drawing the portion of a subject graphic having vertices V0 to V6 that is included in a clipping region 500.

Figure 21:
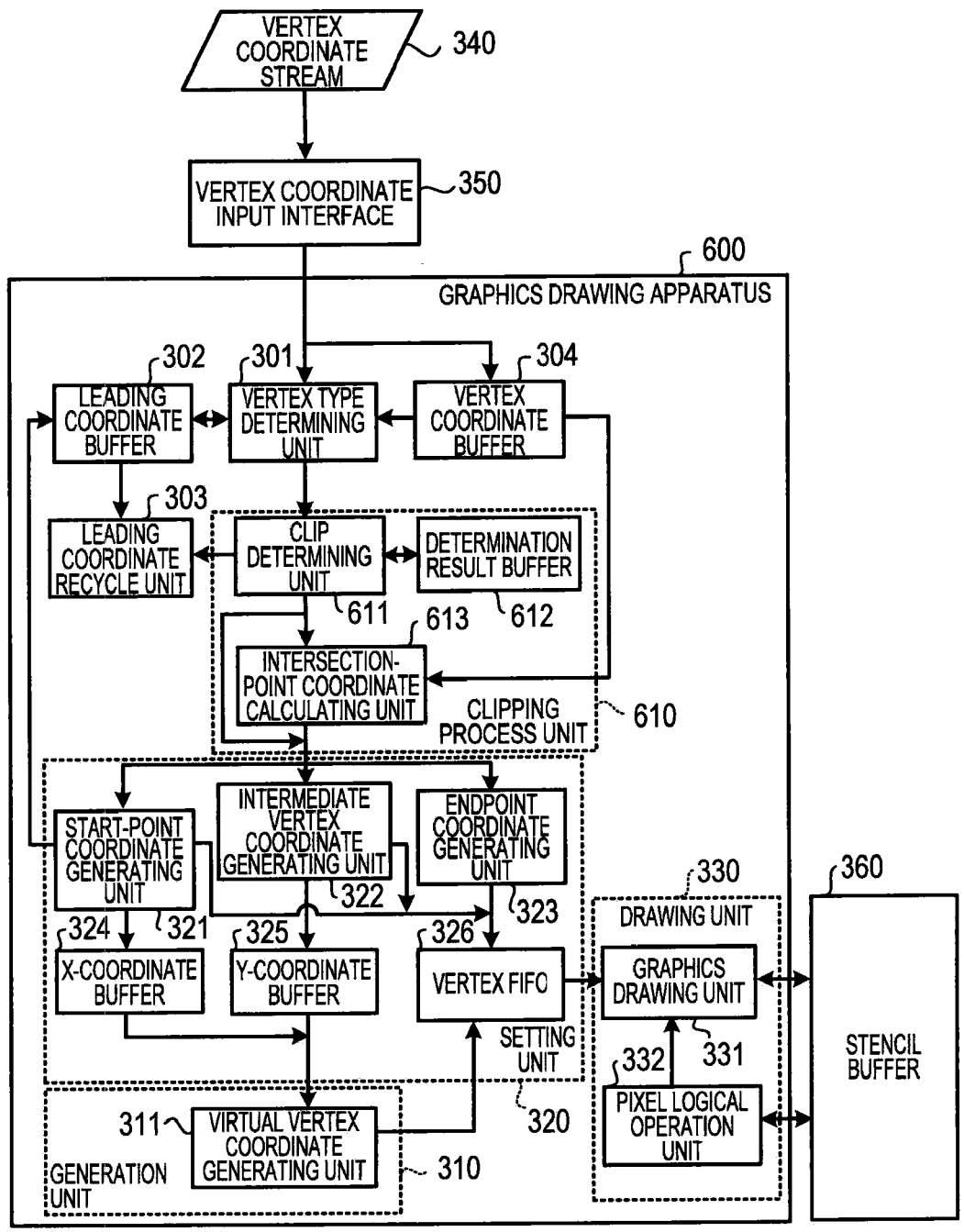
FIG. 21 illustrates a block diagram showing a functional configuration of the graphics drawing apparatus according to the second embodiment.

A functional configuration of the graphics drawing apparatus according to the second embodiment will be described next. FIG. 21 is a block diagram showing a functional configuration of the graphics drawing apparatus according to the second embodiment. As shown in FIG. 21, the graphics drawing apparatus 600 according to the second embodiment has the same configuration as the graphics drawing apparatus 300 of the first embodiment except that a clipping process unit 610 is added. That is, the graphics drawing apparatus 600 according to the second embodiment includes a vertex type determining unit 301, a leading coordinate buffer 302, a leading coordinate recycle unit 303, a vertex coordinate buffer 304, a generation unit 310, a setting unit 320, a drawing unit 330, and a clipping process unit 610.

The clipping process unit 610 includes a clip determining unit 611, a determination result buffer 612, and an intersection-point coordinate calculating unit 613. The clip determining unit 611 has the function of determining whether input vertex coordinates are included in a clipping area. The result of determination by the clip determining unit 611 is output to the determination result buffer 612 and the vertex coordinates are output to the intersection-point coordinate calculating unit 613. That is, the type of vertex coordinates input from a vertex coordinate stream 340 through a vertex coordinate input interface 350 is determined by the vertex type determining unit 301. Then, determination is made by the clip determining unit 611 as to whether the vertex coordinates are included in the clipping region or not.

The determination result buffer 612 has the function of storing the result of determination made by the clip determining unit 611. The result of determination stored in the determination result buffer 612 is overwritten after each partial graphic is drawn by the graphics drawing apparatus 600.

Based on the result of determination by the clip determining unit 611 and the result of determination for the previous vertex coordinates stored in the determination result buffer 612, determination is made as to whether there are intersection-point coordinates, a detailed description of which will be omitted herein since the method is well known in the art. If there are intersection-point coordinates, there are three possibilities: the coordinates of a first one of two adjacent vertices are determined as being outside the clipping region, the coordinates of a second one of the two adjacent vertices are determined as being outside the clipping region, and the coordinates of both of the adjacent vertices are determined as being outside the clipping region.

The intersection-point coordinate calculating unit 613 has the function of calculating intersection-point coordinates. Intersection-point coordinates are the coordinates of the intersection point between the boundary of the clipping region and the line connecting two adjacent vertices, for example. Intersection-point coordinates may be the coordinates of an intersection point between a straight line extended from a vertex in the X- or Y-axis direction and the boundary of the clipping region.

Figure 22:
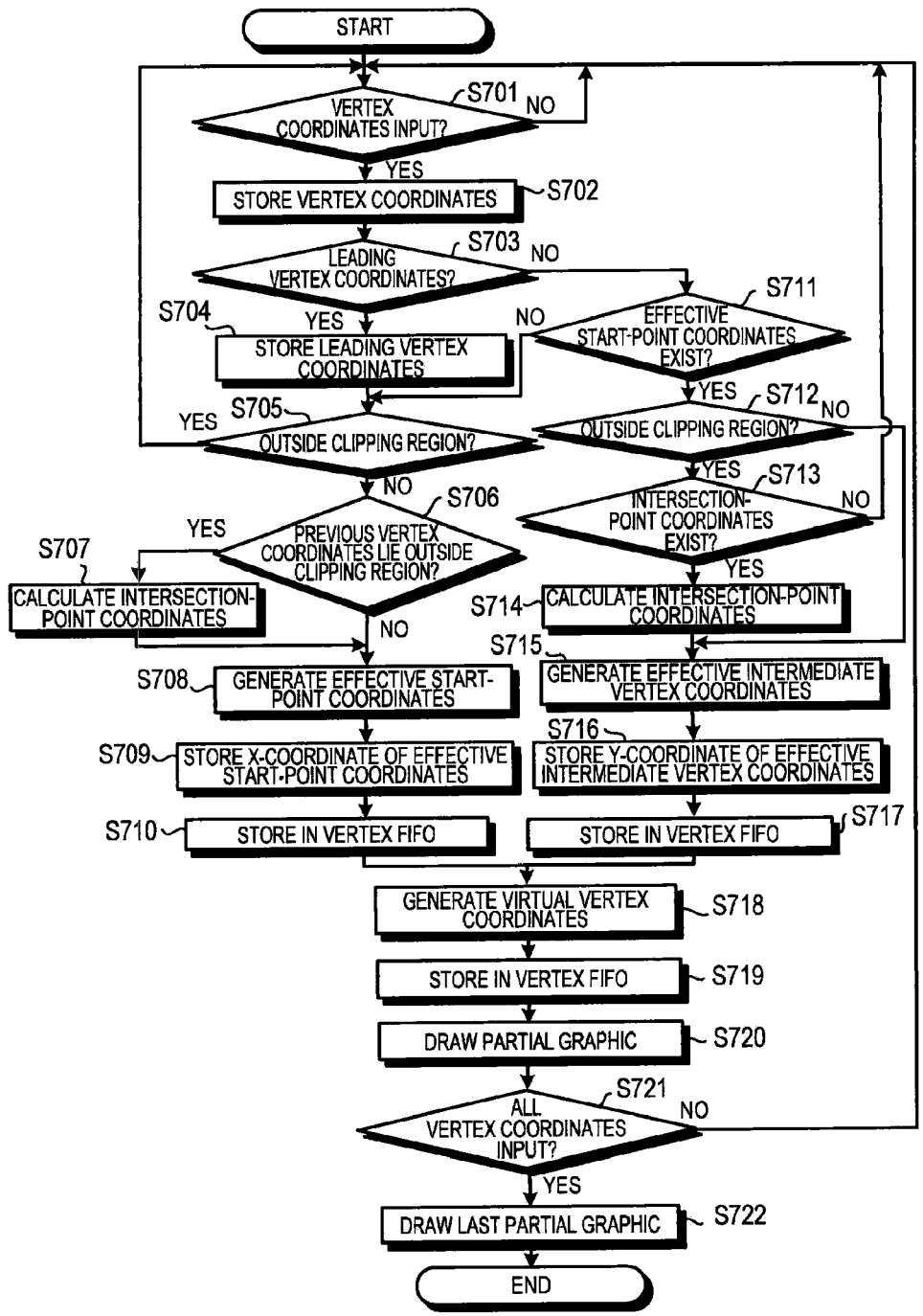
FIG. 22 illustrates a flowchart showing a procedure performed by the graphics drawing apparatus according to the second embodiment.

A process performed by the graphics drawing apparatus 600 according to the second embodiment will be described next. FIG. 22 is a flowchart showing the process performed by the graphics drawing apparatus according to the second embodiment. The process of the flowchart shown in FIG. 22 starts in response to an instruction to draw a subject graphic issued from an application, for example.

The graphics drawing apparatus 600 first waits for an input of vertex coordinates (step S701: the negation loop). In particular, the graphics drawing apparatus 600 waits until vertex coordinates are input in the graphics drawing apparatus 600 from a vertex coordinate stream 340 generated by an application, for example, through the vertex coordinate input interface 350.

When vertex coordinates are input at step S701 (step S701: Yes), the graphics drawing apparatus 600 stores the vertex coordinates (step S702). In particular, the graphics drawing apparatus 600 stores the input vertex coordinates in the vertex coordinate buffer 304.

Then, determination is made as to whether the input vertex coordinates are the leading vertex coordinates in a sequence of input vertex coordinates (step S703). In particular, the graphics drawing apparatus 600 determines the type of the input vertex coordinates by the vertex type determining unit 301. If it is determined at step S703 that the input vertex coordinates are the leading vertex coordinates (step S703: Yes), the process proceeds to step S704; otherwise (step S703: No) the process proceeds to step S711.

If it is determined at step S703 that the input vertex coordinates are the leading vertex coordinates (step S703: Yes), the leading vertex coordinates are stored (step S704). In particular, the graphics drawing apparatus 600 stores the vertex coordinates determined by the vertex type determining unit 301 as the leading vertex coordinates in the leading coordinate buffer 302. More specifically, if the leading vertex coordinates are (V0x, V0y), (V0x, V0y) are stored in the leading coordinate buffer 302.

After the leading vertex coordinates are stored at step S704, determination is made as to whether the leading vertex coordinates lie outside a clipping region (step S705). In particular, the graphics drawing apparatus 600 determines whether the input vertex coordinates determined by the vertex type determining unit 301 as the leading vertex coordinates lie outside the clipping region by the clip determining unit 611. If it is determined at step S705 that the leading vertex coordinates do not lie outside the clipping region (step S705: No), the process proceeds to step S706; if it is determined that the leading vertex coordinates lie outside the clipping region (step S705: Yes), the process returns to step S701.

If it is determined at step S705 that the leading vertex coordinates do not lie outside the clipping region (step S705: No), determination is made as to whether the previous vertex coordinates lie outside the clipping region (step S706). In particular, the graphics drawing apparatus 600 makes the determination on the basis of the result of determination for the previous vertex coordinates stored in the determination result buffer 612. If it is determined at step S706 that the previous vertex coordinates do not lie outside the clipping region (step S706: No), the process proceeds to step S708; if it is determined that the previous vertex coordinates lie outside the clipping region (step S706: Yes), the process proceeds to step S707. If the input vertex coordinates are the leading vertex coordinates, there are no previous vertex coordinates and therefore it is assumed that previous vertex coordinates do not lie outside the clipping region and the process proceeds to step S708.

If it is determined at step S706 that the previously input vertex coordinates lie outside the clipping region (step S706: Yes), intersection-point coordinates are calculated (step S707). In particular, the graphics drawing apparatus 600 calculates intersection-point coordinates by the intersection-point coordinate calculating unit 613 on the basis of at least either the input vertex coordinates or the previous vertex coordinates. More specifically, the graphics drawing apparatus 600 calculates the coordinates of the intersection point between the line that connects the input vertex coordinates to the previous vertex coordinates and the boundary 500a.

Effective start-point coordinates are generated from the input leading vertex coordinates input from step S706 or the intersection-point coordinates calculated at step S707 (step S708). In particular, the graphics drawing apparatus 600 inputs the leading vertex coordinates or the calculated intersection-point coordinates into a start-point coordinate generating unit 321, which then generates the effective start-point coordinates from the input leading vertex coordinates or the calculated vertex coordinates. More specifically, if it is determined that the leading vertex coordinates do not lie outside the clipping region, the leading vertex coordinates are generated as effective start-point coordinates; if it is determined that the leading vertex coordinates lie outside the clipping region, the intersection-point coordinates calculated at step S707 are generated as effective start-point coordinates.

After the effective start-point coordinates are generated at step S708, the X-coordinate of the generated effective start-point coordinates is stored (step S709). In particular, the graphics drawing apparatus 600 stores the X-coordinate of the effective start-point coordinates generated by the start-point coordinate generating unit 321 in the X-coordinate buffer 324. More specifically, if the effective start-point coordinates are (C0x, C0y), for example, the X-coordinate C0x of the effective start-point coordinates (C0x, C0y) is stored in the X-coordinate buffer 324. At the same time, the generated effective start-point-coordinates (C0x, C0y) themselves are stored in the leading coordinate buffer 302.

After the X-coordinate of the effective start-point coordinates is stored at step S709, the effective start-point coordinates are stored in a vertex FIFO (step S710). In particular, after storing the X-coordinate of the effective start-point coordinates in the X-coordinate buffer 324, the graphics drawing apparatus 600 outputs the effective start-point coordinates to the vertex FIFO 326 to store them in the vertex FIFO 326. More specifically, if the effective start-point coordinates are (C0x, C0y), for example, (C0x, C0y) are stored in the vertex FIFO 326.

If it is determined at step S703 that the input vertex coordinates are not leading vertex coordinates (step S703: No), determination is made as to whether effective start-point coordinates are already held (step S711). In particular, the graphics drawing apparatus 600 determines whether vertex coordinates that represent effective start-point coordinates are already stored in the leading coordinate buffer 302. If it is determined at step S711 that effective start-point coordinates are held (step S711: Yes), the process proceeds to step S712; otherwise (step S711: No), the process proceeds to step S705.

If it is determined at step S711 that effective start-point coordinates are already held (step S711: Yes), determination is made as to whether the input vertex coordinates lie outside the clipping region (step S712). In particular, the graphics drawing apparatus 600 makes the determination for the input vertex coordinates by using the clip determining unit 611. If it is determined at step S712 that the input vertex coordinates do not lie outside the clipping region (step S712: No), the process proceeds to step S715; otherwise (step S712: Yes), the process proceeds to step S713.

If it is determined at step S712 that the vertex coordinates lie outside the clipping region (step S712: Yes), determination is made as to whether there are intersection-point coordinates (step S713). In particular, the graphics drawing apparatus 600 makes the determination on the basis of the result of determination made for the input vertex coordinates by the clip determining unit 611 and the result of determination for the previous vertex coordinates stored in the determination result buffer 612. If it is determined that there are intersection-point coordinates (step S713: Yes), the process proceeds to step S714; otherwise (step S713: No), the process returns to step S701.

If it is determined at step S713 that there are intersection-point coordinates (step S713: Yes), the intersection-point coordinates are calculated (step S714). In particular, the graphics drawing apparatus 600 calculates the intersection-point coordinates on the basis of at least either the input vertex coordinates or the previous vertex coordinates and on the boundary 500a. More specifically, the graphics drawing apparatus 600 calculates the coordinates of the intersection point between the line connecting the input vertex coordinates to the previous vertex coordinates and the boundary 500a.

After the intersection-point coordinates are calculated at step S714, the intersection-point coordinates are generated as effective intermediate vertex coordinates (step S715). In particular, the graphics drawing apparatus 600 outputs the intersection-point coordinates calculated by the intersection-point coordinate calculating unit 613 to the intermediate vertex coordinate generating unit 322 and generates effective intermediate vertex coordinates from the calculated intersection-point coordinates by the intermediate vertex coordinate generating unit 322.

The effective intermediate vertex coordinates are generated from the input vertex coordinates from step S712 or from the intersection-point coordinates calculated at step S714 (step S715). In particular, the graphics drawing apparatus 600 inputs the input vertex coordinates or the calculated intersection-point coordinates into the intermediate vertex coordinate generating unit 322 to generate the effective intermediate vertex coordinates. More specifically, if it is determined that the input vertex coordinates do not lie outside the clipping region, the vertex coordinates are generated as intermediate vertex coordinates; if it is determined that the input vertex coordinates lie outside the clipping region, the intersection-point coordinates calculated at step S714 are generated as effective intermediate vertex coordinates.

After the effective intermediate vertex coordinates are generated at step S715, the Y-coordinate of the generated effective intermediate vertex coordinates is stored (step S716). In particular, the graphics drawing apparatus 600 stores the Y-coordinate of the effective intermediate vertex coordinates generated by the intermediate vertex coordinate generating unit 322 in the Y-coordinate buffer 325. More specifically, if the effective intermediate vertex coordinates are (C1x, C1y), for example, the Y-coordinate C1y of the effective intermediate vertex coordinates (C1x, C1y) is stored in the Y-coordinate buffer 325.

After storing the Y-coordinate of the effective intermediate vertex coordinates at step S716, the effective intermediate vertex coordinates are stored in the vertex FIFO (step S717). In particular, after storing the Y-coordinate of the effective intermediate vertex coordinates in the Y-coordinate buffer 325, the graphics drawing apparatus 600 outputs the effective intermediate vertex coordinates to the vertex FIFO 326 to store them in the vertex FIFO 326. More specifically, if the effective intermediate vertex coordinates are (C1$x$, C1$y$), (C1$x$, C1$y$) are stored in the vertex FIFO 326.

After the effective start-point coordinates and the effective intermediate vertex coordinates are stored in the vertex FIFO at steps S710 and S717, virtual vertex coordinates are generated from the X-coordinate of the effective start-point coordinates and the Y-coordinate of the effective intermediate vertex coordinates (step S718). In particular, the graphics drawing apparatus 600 generates virtual vertex coordinates by the virtual vertex coordinate generating unit 311 from the X-coordinate of the effective start-point coordinates stored in the X-coordinate buffer 324 and the Y-coordinate of the effective intermediate vertex coordinates stored in the Y-coordinate buffer 325. More specifically, if the X-coordinate stored in the X-coordinate buffer 324 is C0$x$ and the Y-coordinate stored in the Y-coordinate buffer 325 is C1$y$, the virtual vertex coordinates (C0$x$, C1$y$) of a virtual vertex C1' are generated.

After generating the virtual vertex coordinates at step S718, the generated virtual vertex coordinates are stored in the vertex FIFO (step S719). In particular, the graphics drawing apparatus 600 generates virtual vertex coordinates by the virtual vertex coordinate generating unit 311 from the X-coordinate stored in the X-coordinate buffer 324 and the Y-coordinate stored in the Y-coordinate buffer 325 and outputs the virtual vertex coordinates to the vertex FIFO 326 to store them in the vertex FIFO 326. More specifically if the virtual vertex coordinates are (C0$x$, C1$y$), (C0$x$, C1$y$) are stored in the vertex FIFO 326.

A partial graphic is drawn on the basis of the vertex coordinates that have been stored in the vertex FIFO at step S719 (step S720). In particular, the graphics drawing apparatus 600 outputs the coordinates of two adjacent vertices of a partial graphic that are to be created and are stored in the vertex FIFO 326 and their virtual vertex coordinates to the drawing unit 330 to cause the drawing unit 330 to draw the partial graphic in a stencil buffer area in a stencil buffer 360. More specifically, if vertices C0, C1, and C1' are stored in the vertex FIFO 326, a partial graphic having vertices C0, C1, and C1' is drawn in the stencil buffer area 100.

After the partial graphic is drawn at step S720, determination is made as to whether the coordinates of all vertices have been input (step S721). In particular, the graphics drawing apparatus 600 determines that the coordinates of all vertices have been input when the coordinates of a vertex determined by the vertex type determining unit 301 as the trailing vertex have been input.

If it is determined at step S721 that the coordinates of all vertices have been input (step S721: Yes), the last partial graphic is drawn (step S722). After the last partial graphic is drawn, the process will end. In particular, the last partial graphic is drawn on the basis of the endpoint coordinates (i.e. the effective start-point coordinates) generated by the endpoint coordinate generating unit 323, the previous vertex coordinates preceding the first vertex coordinates included in the clipping region, and the virtual vertex coordinates for the previous vertex coordinates. If it is determined that not all vertex coordinates have been input yet (step S721: No), the process returns to step S701 and the same process is repeated.

In this way, the graphics drawing apparatus 600 of the second embodiment is capable of drawing partial graphics for a subject graphic that has vertices lying outside a clipping region in a manner similar to that in the first embodiment by calculating and using effective vertex coordinates of various vertices. Therefore the graphics drawing apparatus 600 can provide the same effects as those of the first embodiment.

A third embodiment will be described next. In the second embodiment, the effective start-point coordinates are calculated on the basis of the coordinates of the first vertex included in the clipping region and the coordinates of the vertex preceding the first vertex. In the third embodiment, an example will be described in which effective start-point coordinates are arbitrary coordinates included in a clipping region. The same components as those in the first and second embodiments will be labeled with the same reference numerals, the description of which will be omitted.

A process for drawing a subject graphic by a graphics drawing apparatus 600 according to the third embodiment will be described first. FIGS. 23 to 28 are illustrations (1 of 6) to (6 of 6) showing a process for drawing a subject graphic by the graphics drawing apparatus according to the third embodiment. First, the coordinates of vertices V0 to V2 are input in the graphics drawing apparatus 600 from a vertex coordinate stream through a vertex coordinate input interface. The coordinates lie outside a clipping region 500. Here, the graphics drawing apparatus 600 adds effective start-point coordinates (V-1$x$, V-1$y$) before V0. The coordinates (V-1$x$, V-1$y$) may be any coordinates included in the clipping region 500. It is assumed in the third embodiment that the effective coordinates are on the boundary 500$a$ and has the same Y-coordinate as (V0$x$, V0$y$).

After (V-1$x$, V-1$y$) are added, (V-1$x$, V-1$y$) are used as effective start-point coordinates to perform a process by conducting a procedure similar to that in the second embodiment. In the course of the process, a vertex (V3$x$, V3$y$) enters first the clipping region 500. At this point in time, the graphics drawing apparatus 600 calculates the coordinates of the intersection point C0 (C0$x$, C0$y$) between the line connecting V2 to V3 and the boundary 500$a$. After (C0$x$, C0$y$) are calculated, the effective intermediate vertex coordinates (C0$x$, C0$y$) are generated and the Y-coordinate of (C0$x$, C0$y$) is stored in a Y-coordinate buffer 325. Then, the virtual vertex coordinates (V-1$x$, C0$y$) of the virtual vertex C0' are generated on the basis of (V-1$x$, V-1$y$) and (C0$x$, C0$y$).

Figure 23:
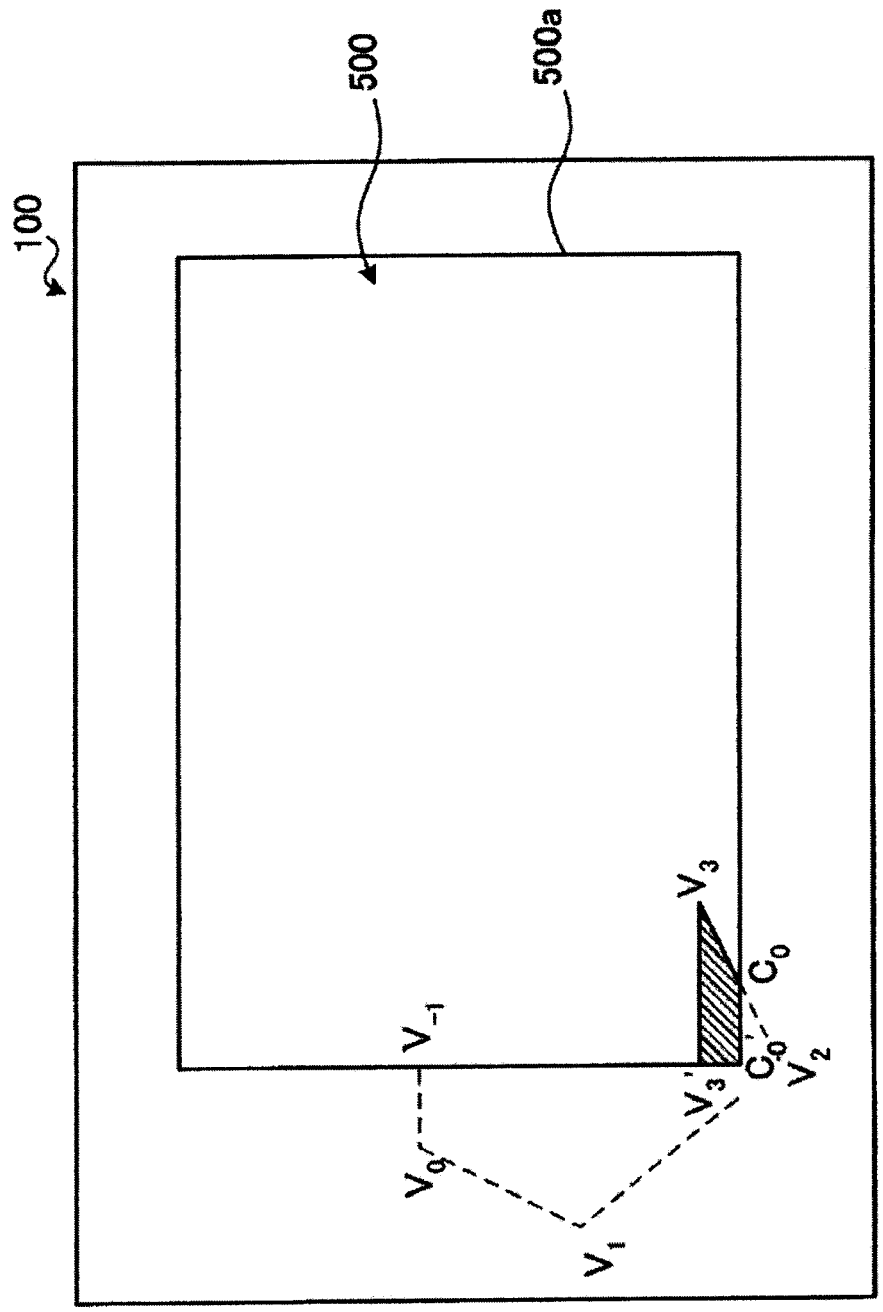
FIG. 23 is an illustration (1 of 6) showing a process for drawing a subject graphic by a graphics drawing apparatus according to a third embodiment.

That is, the virtual vertex coordinates (V-1$x$, C0$y$) have the same X-coordinate as the effective start-point coordinates (V-1$x$, V-1$y$) and the same Y-coordinates as the effective intermediate vertex coordinates (C0$x$, C0$y$). After generating the virtual vertex coordinates (V-1$x$, C0$y$), the graphics drawing apparatus 600 draws a partial graphics having vertices V3, V3', C0', and C0 in a stencil buffer area 100 by using exclusive-OR operation (FIG. 23).

Then, intermediate vertex coordinates (V4$x$, V4$y$) are input in the graphics drawing apparatus 600. Here, (V4$x$, V4$y$) lie outside the clipping region 500, therefore the graphics drawing apparatus 600 calculates the coordinates (C1$x$, C1$y$) of the intersection point C1 between the line connecting V3 to V4 and the boundary 500$a$. After calculating (C1$x$, C1$y$), the effective intermediate vertex coordinates (C1$x$, C1$y$) are generated and the Y-coordinate of (C1$x$, C1$y$) is stored in the Y-coordinate buffer 325. Then the virtual vertex coordinates (V-1$x$, C1$y$) of a virtual vertex C1' are generated on the basis of the effective start-point coordinates (V-1$x$, V-1$y$) and the effective intermediate vertex coordinates (C1$x$, C1$y$).

Figure 24:
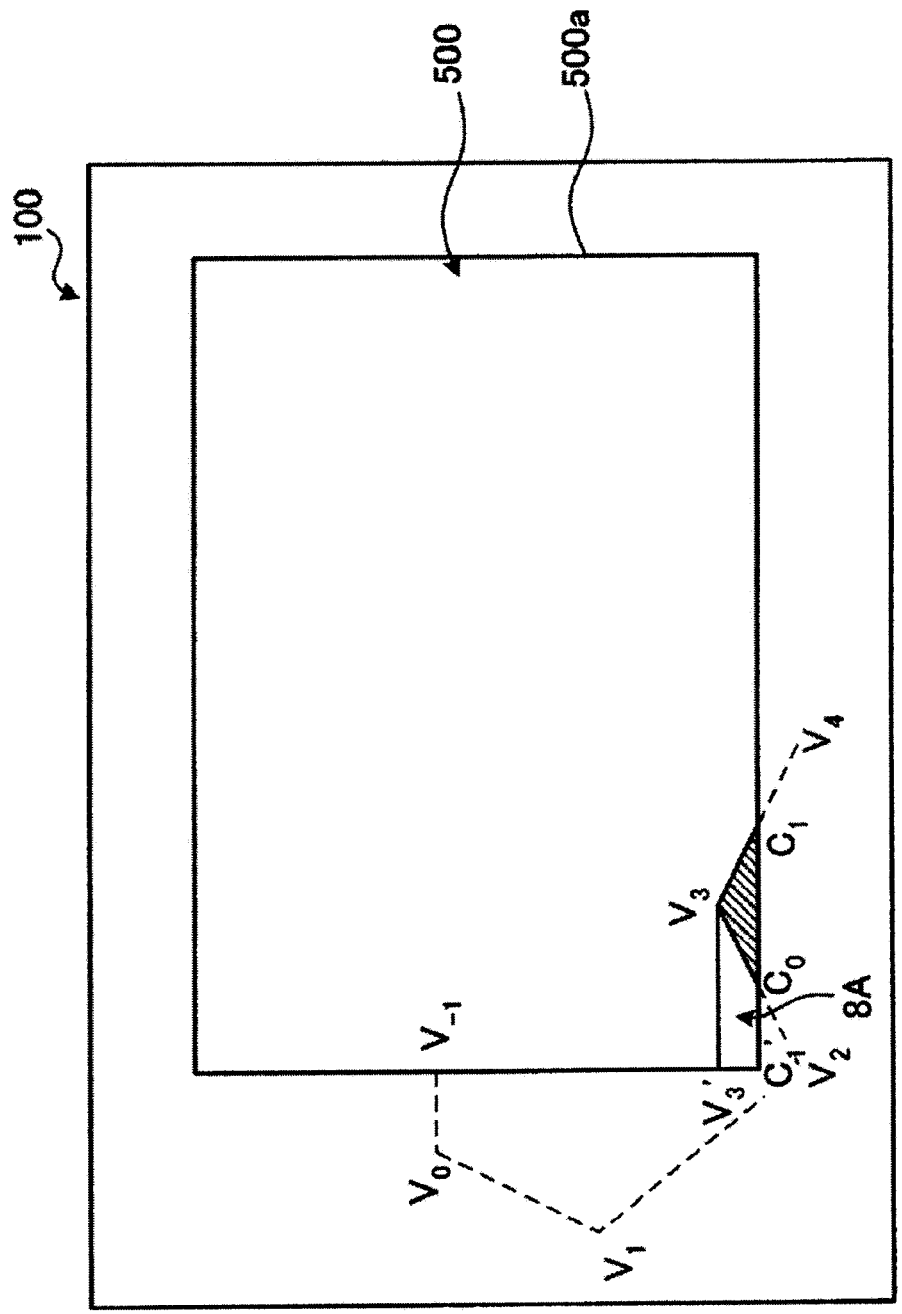
FIG. 24 is an illustration (2 of 6) showing the process for drawing the subject graphic by the graphics drawing apparatus according to the third embodiment.

That is, the virtual vertex coordinates (V-1$x$, C1$y$) have the same X-coordinate as the effective start-point coordinates (V-1$x$, V-1$y$) and the same Y-coordinate as the effective intermediate vertex coordinates (C1$x$, C1$y$). After generating the virtual vertex coordinates (V-1$x$, C1$y$), the graphics drawing apparatus 600 draws a partial graphic having vertices V3, V3', C1', and C1 in the stencil buffer area 100 by using exclusive- OR operation. The graphics portion in area 8A is deleted because an even number of graphics overlaps one another in area 8A (FIG. 24).

Then, intermediate vertex coordinates (V5x, V5y) are input in the graphics drawing apparatus 600. Here, the coordinates (V5x, V5y) lie outside the clipping region 500. Therefore, the graphics drawing apparatus 600 calculates the coordinates (C2x, C2y) and (C3x, C3y) of the intersection points C2 and C3, respectively, between the line connecting V4 to V5 and the boundary 500a. After (C2x, C2y) and (C3x, C3y) are calculated, the effective intermediate vertex coordinates (C2x, C2y) and (C3x, C3y) are generated and the Y-coordinates of (C2x, C2y) and (C3x, C3y) are stored in the Y-coordinate buffer 325. Based on (V-1x, V-1y) and (C2x, C2y), and (C3x, C3y), the virtual vertex coordinates (V-1x, C2y) and (V-1x, C3y) of virtual vertices C2' and C3', respectively, are generated.

Figure 25:
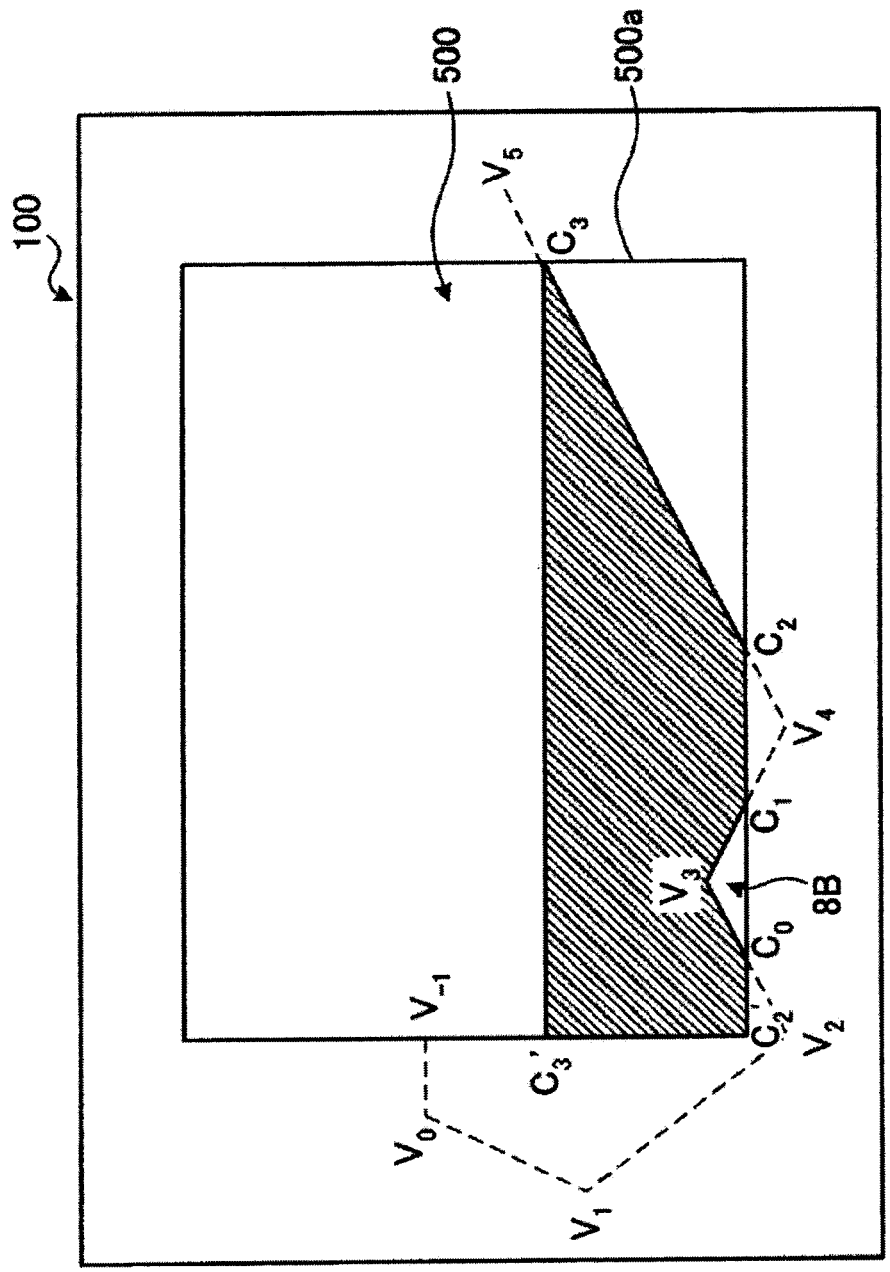
FIG. 25 is an illustration (3 of 6) showing the process for drawing the subject graphic by the graphics drawing apparatus according to the third embodiment.

That is, the virtual vertex coordinates (V-1x, C2y) have the same X-coordinate as the effective start-point coordinates (V-1x, V-1y) and the same Y-coordinate as the effective intermediate vertex coordinates (C2x C2y); the virtual vertex coordinates (V-1x, C3y) have the same X-coordinate as the effective start-point coordinates (V-1x, V-1y) and the same Y-coordinate as the effective intermediate vertex coordinates (C3x, C3y). After generating the virtual vertex coordinates (V-1x, C2y) and (V-1x, C3y), the graphics drawing apparatus 600 draws a partial graphic having vertices C2, C2', C3', and C3 in the stencil buffer area 100 by using exclusive-OR operation. The graphics portion in area 8B is deleted because an even number of partial graphics overlaps one another in area 8B (FIG. 25).

Then, intermediate vertex coordinates (V6x, V6y) are input in the graphics drawing apparatus 600. Here, (V6x, V6y) are inside the clipping region 500. Thus, the vertex enters the clipping region 500 from outside the clipping region 500. The graphics drawing apparatus 600 calculates the coordinates (C4x, C4y) of the intersection point C4 between the line connecting V5 to V6 and the boundary 500a. After (C4x, C4y) are calculated, the effective intermediate vertex coordinates (C4x, C4y) are generated and the Y-coordinate of (C4x, C4y) is stored in the Y-coordinate buffer 325. Based on the effective start-point coordinates (V-1x, V-1y) and the effective intermediate vertex coordinates (C4x, C4y), the virtual vertex coordinates (V-1x, C4y) of a virtual vertex C4' are generated.

Figure 26:
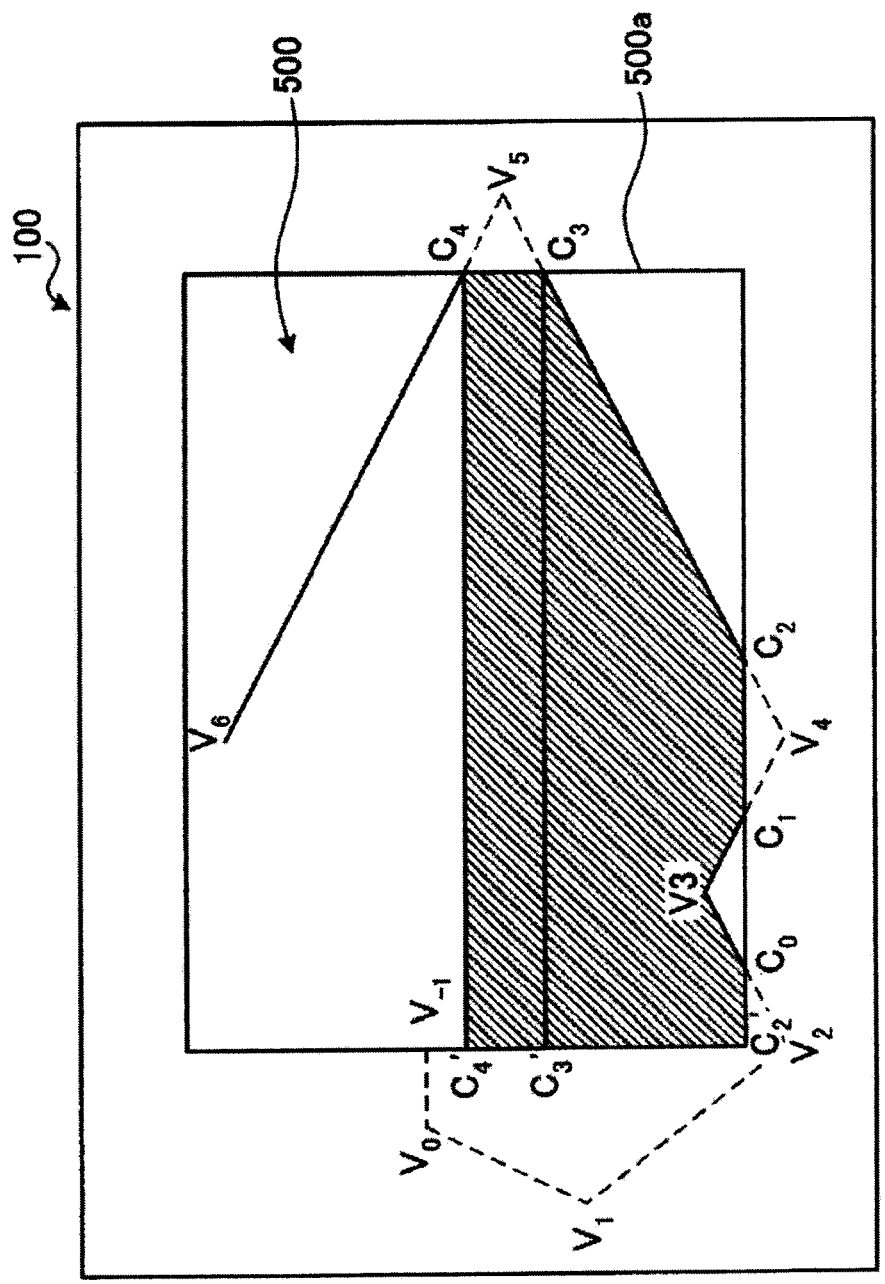
FIG. 26 is an illustration (4 of 6) showing the process for drawing the subject graphic by the graphics drawing apparatus according to the third embodiment.

That is, the virtual vertex coordinates (V-1x, C4y) have the same X-coordinate as the effective start-point coordinates (V-1x, V-1y) and the same Y-coordinate as the effective intermediate vertex coordinates (C4x, C4y). After generating the virtual vertex coordinates (V-1x, C4y), the graphics drawing apparatus 600 draws a partial graphic having vertices C3, C3', C4', and C4 in the stencil buffer area 100 by using exclusive-OR operation (FIG. 26).

Figure 27:
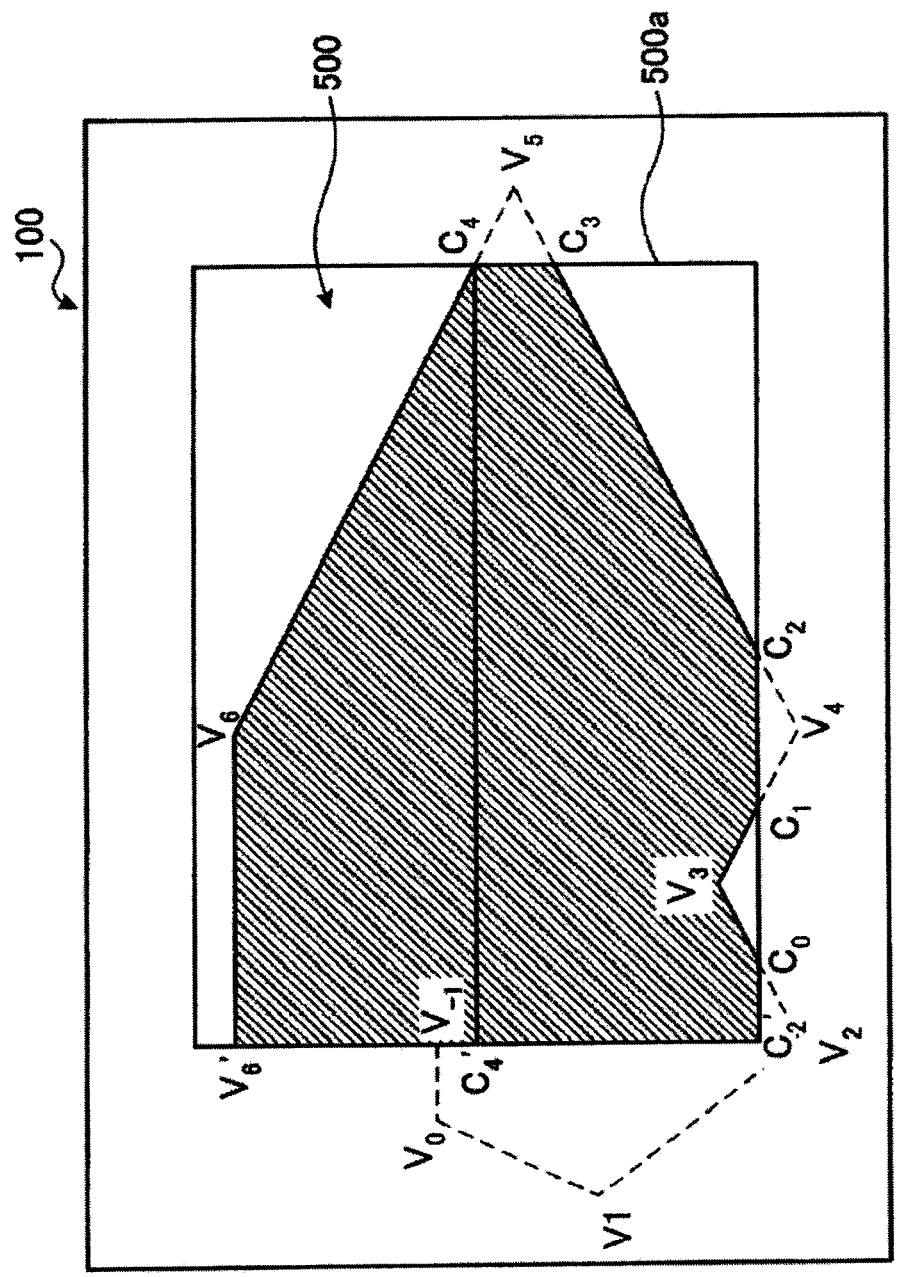
FIG. 27 is an illustration (5 of 6) showing the process for drawing the subject graphic by the graphics drawing apparatus according to the third embodiment.

Then, based on the effective start-point coordinates (V-1x, V-1y) and the intermediate vertex coordinates (V6x, V6y), the virtual vertex coordinates (V-1x, V6y) of a virtual vertex V6' are generated. That is, the virtual vertex coordinates (V-1x, V6y) have the same X-coordinate as the effective start-point coordinates (V-1x, V-1y) and the same Y-coordinate as the intermediate vertex coordinates (V6x, V6y). After generating the virtual vertex coordinates (V-1x, V6y), the graphics drawing apparatus 600 draws a partial graphic having vertices C4, C4', V6', and V6 in the stencil buffer area 100 by using exclusive-OR operation (FIG. 27).

Figure 28:
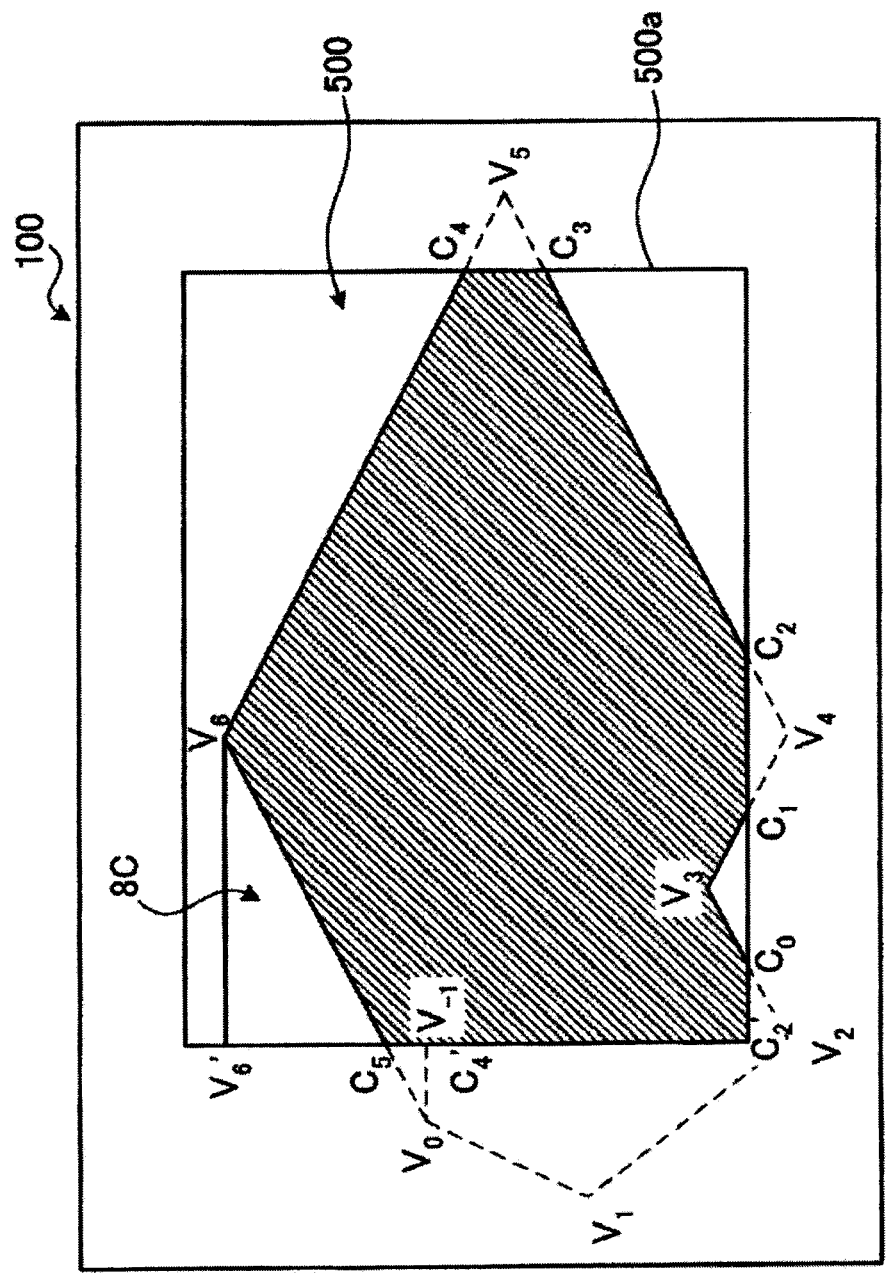
FIG. 28 is an illustration (6 of 6) showing the process for drawing the subject graphic by the graphics drawing apparatus according to the third embodiment.

After completion of the processing for the last vertex V6, the graphics drawing apparatus 600 re-inputs the coordinates of V0 as the endpoint coordinates. After inputting V0, the graphics drawing apparatus 600 calculates the coordinates (C5x, C5y) of the intersection point C5 between the line connecting the endpoint coordinates (V0x, V0y) to the intermediate vertex coordinates (V6x, V6y) and the boundary 500a. After calculating (C5x, C5y), the graphics drawing apparatus 600 generates the effective intermediate vertex coordinates (C5x, C5y) and draws a partial graphic having vertices C5, V6', and V6 in the stencil buffer area 100 by using exclusive-OR operation. The graphics portion in area 8C is deleted because an even number of graphics overlaps one another in area 8C (FIG. 28).

In this way, the portion of the subject graphic having the vertices at the input vertex coordinates that is included in the clipping region 500 is drawn in the stencil buffer area 100.

The third embodiment is the same as the second embodiment except that arbitrary coordinates inside a clipping region 500 are obtained first and the obtained coordinates are input in the graphics drawing apparatus 600 as the coordinates of the leading vertex. That is, arbitrary coordinates inside the clipping region 500 are obtained and are input in the graphics drawing apparatus 600 as the coordinates of the leading vertex. The rest of the process is the same as that of the second embodiment.

The arbitrary coordinates to be obtained may be determined by an application. Alternatively, the graphics drawing apparatus 600 itself may obtain coordinates that the graphics drawing apparatus 600 estimates will allow a subject graphic to be drawn with the minimum number of steps.

As has been described, the graphics drawing apparatus 600 according to the third embodiment, like the graphics drawing apparatus of the second embodiment, generates effective vertex coordinates from input vertex coordinates and also generates virtual vertices V1' to V6' for the effective vertex coordinates, thereby drawing a portion of a subject graphic having vertices V0 to V6 that is included in a clipping region 500.

Furthermore, the graphics drawing apparatus 600 according to the third embodiment can reduce the number of partial graphics making up a subject graphic by setting optimum vertex coordinates in a clipping region 500 as effective start-point coordinates. Consequently, the subject graphic can be drawn quickly as compared with the second embodiment.

According to the embodiment, a subject graphic is constructed with partial graphics, each having two adjacent vertices and virtual vertex coordinates generated for the coordinates of the two vertices. Accordingly, the scan lines involved in drawing each fragment graphic are only those between the two adjacent vertices. Therefore, the number of random accesses to VRAM can be reduced and therefore the rendering speed can be increased.

Any of the graphics drawing methods of the present embodiments described can be implemented by executing a program, which is provided beforehand, on a computer such as a personal computer or workstation. The program is recorded on a computer-readable recording medium such as a hard disk, flexible disk, CD-ROM, MO, or DVD, and is read from the recording medium by a computer and executed on the computer. The program may be distributed through a network such as the Internet.

What is claimed is:

1. A graphics drawing apparatus drawing a graphic, comprising:
   a memory corresponding to a two-dimensional coordinate system including an X-axis representing a direction in which consecutive memory addresses are arranged and a Y-axis intersecting the X-axis;
   a generation unit, when a sequence of two-dimensional coordinates of vertices including a leading vertex which is input first and last, a plurality of intermediate vertices which are input after the leading vertex and the trailing vertex which is input after the plurality of intermediate vertices is input, generating a virtual vertex having virtual vertex coordinates by setting the X-coordinate value of the leading vertex to the X-coordinate value of the virtual vertex coordinates and setting the Y-coordinate value of one of the plurality of intermediate vertices to the Y-coordinate value of the virtual vertex coordinates; and a drawing unit performing a drawing process drawing in the memory a partial graphic after generating one or more virtual vertices corresponding to respective intermediate vertices among the plurality of intermediate vertices, the partial graphic being defined by the one or more virtual vertices and the respective intermediate vertices, the drawing unit performing the drawing process drawing in the memory a trailing partial graphic defined the reading vertex, the trailing vertex and the virtual vertex corresponding to the trailing vertex when the leading vertex is input after the trailing vertex is input, wherein when a part or all of a first partial graphic defined by a first intermediate vertex, a second intermediate vertex and the virtual vertices corresponding to the first intermediate vertex and the second intermediate vertex overlaps a second partial graphic defined by the intermediate second vertex, a third intermediate vertex input after the second vertex and the virtual vertices corresponding to the second intermediate vertex and the third intermediate vertex, the drawing unit deletes the overlapping portion from the memory to output a graphic having vertices at the sequence of two-dimensional coordinates of vertices.

2. The graphics drawing apparatus according to claim 1, further comprising a determination unit, when the coordinates of each vertex in the sequence are input, determining whether a line connecting the coordinates of the two adjacent vertices intersects a boundary of a clipping region being preset on the memory, wherein, if the determination unit determines that the line connecting the coordinates of the two adjacent vertices intersects the boundary, the generation unit generates effective vertex coordinates which is new vertex coordinates and virtual vertex coordinates for the effective vertex coordinates on the boundary of the clipping region on the basis of the coordinates of at least one of the two adjacent vertices;

the setting unit sets the effective vertex coordinates generated by the generation unit as the coordinates of one of two vertices of a partial graphic that is to be created instead of the coordinates of the vertex on which the effective vertex coordinates are based; and the drawing unit draws a partial graphics defined by the coordinates of two vertices including the effective vertex coordinates of a partial graphic to be created set by the setting unit as vertex coordinates.

3. The graphics drawing apparatus according to claim 1, wherein the coordinate of the leading vertex is input as a coordinate of a final vertex after inputting the trailing vertex.

4. The graphics drawing apparatus according to claim 2, wherein if the determination unit determines that the line connecting the coordinates of the two adjacent vertices intersects the boundary, the generation unit generates the coordinates of an intersection point between the line connecting the coordinates of two adjacent vertices and the boundary of the clipping region as the effective vertex coordinates.

5. The graphics drawing apparatus according to claim 4, wherein if the determination unit determines that the line connecting the coordinates of two adjacent vertices that include the coordinates of the leading vertex intersects the boundary, the generation unit generates the virtual vertex coordinates by substituting the coordinates of the intersection point as the vertex coordinates for the coordinate or of the leading vertex and by converting, at least one of the X-coordinate value of input vertex coordinates and the X-coordinate value of the coordinates of the intersection point generated to the X-coordinate value of effective start-point coordinates.

6. The graphics drawing apparatus according to claim 4, wherein if the determination unit determines that the line connecting the coordinates of two adjacent vertices including the coordinates of the leading vertex intersects the boundary, the generation unit generates the virtual vertex coordinates by substituting arbitrary coordinates in the clipping region for the coordinates of the leading vertex and by converting, at least one of, the X-coordinate value of input vertex coordinates and the X-coordinate value of the coordinates of the intersection point generated to the X-coordinate value of the coordinates substituted for the coordinates of the leading vertex.

7. A graphics drawing method drawing a graphic by using a memory corresponding to a two-dimensional coordinate system including an X-axis representing a direction in which consecutive memory addresses are arranged and a Y-axis intersecting the X-axis, the graphics drawing method comprising:

when a sequence of two-dimensional coordinates of vertices including a leading vertex which is input first and last, a plurality of intermediate vertices which are input after the leading vertex and the trailing vertex which is input after the plurality of intermediate vertices is input, generating a virtual vertex having virtual vertex coordinates by setting the X-coordinate value of the leading vertex to the X-coordinate value of the virtual vertex coordinates and setting the Y-coordinate value of one of the plurality of intermediate vertices to the Y-coordinate value of the virtual vertex coordinates;

performing a drawing process drawing in the memory a partial graphic after generating one or more virtual vertices corresponding to respective intermediate vertices among the plurality of intermediate vertices, the partial graphic being defined by the one or more virtual vertices and the respective intermediate vertices;

performing the drawing process drawing in the memory a trailing partial graphic defined the reading vertex, the trailing vertex and the virtual vertex corresponding to the trailing vertex when the leading vertex is input after the trailing vertex is input; and deleting the overlapping portion from the memory to output a graphic having vertices at the sequence of two-dimensional coordinates of vertices when a part or all of a first partial graphic defined by a first intermediate vertex, a second intermediate vertex and the virtual vertices corresponding to the first intermediate vertex and the second intermediate vertex overlaps a second partial graphic defined by the intermediate second vertex, a third intermediate vertex input after the second vertex and the virtual vertices corresponding to the second intermediate vertex and the third intermediate vertex.

8. A non-transitory computer-readable recording medium on which a program is recorded, the program causing a computer to draw a graphic by using a memory corresponding to a two-dimensional coordinate system including an X-axis representing a direction in which consecutive memory addresses are arranged and a Y-axis intersecting the X-axis, the program comprising:

when a sequence of two-dimensional coordinates of vertices including a leading vertex which is input first and last, a plurality of intermediate vertices which are input after the leading vertex and the trailing vertex which is input after the plurality of intermediate vertices is input, generating a virtual vertex having virtual vertex coordinates by setting the X-coordinate value of the leading vertex to the X-coordinate value of the virtual vertex coordinates and setting the Y-coordinate value of one of the plurality of intermediate vertices to the Y-coordinate value of the virtual vertex coordinates; and performing a drawing process drawing in the memory a partial graphic after generating one or more virtual vertices corresponding to respective intermediate vertices among the plurality of intermediate vertices, the partial graphic being defined by the one or more virtual vertices and the respective intermediate vertices;

performing the drawing process drawing in the memory a trailing partial graphic defined the reading vertex, the trailing vertex and the virtual vertex corresponding to the trailing vertex when the leading vertex is input after the trailing vertex is input; and deleting the overlapping portion from the memory to output a graphic having vertices at the sequence of two-dimensional coordinates of vertices when a part or all of a first partial graphic defined by a first intermediate vertex, a second intermediate vertex and the virtual vertices corresponding to the first intermediate vertex and the second intermediate vertex overlaps a second partial graphic defined by the intermediate second vertex, a third intermediate vertex input after the second vertex and the virtual vertices corresponding to the second intermediate vertex and the third intermediate vertex.

* * * * *